United States Patent
Novoselsky

(10) Patent No.: US 11,867,795 B2
(45) Date of Patent: Jan. 9, 2024

(54) SYSTEM AND METHOD FOR CONSTRUCTING FUSED TRACKS FROM RADAR DETECTIONS

(71) Applicant: Elta Systems Ltd., Ashdod (IL)

(72) Inventor: Akiva Novoselsky, Modi'in (IL)

(73) Assignee: ELTA SYSTEMS LTD., Ashdod (IL)

( * ) Notice: Subject to any disclaimer, the term of this patent is extended or adjusted under 35 U.S.C. 154(b) by 485 days.

(21) Appl. No.: 17/183,675

(22) Filed: Feb. 24, 2021

(65) Prior Publication Data
US 2022/0163656 A1    May 26, 2022

(30) Foreign Application Priority Data
Feb. 25, 2020   (IL) .......................................... 272897

(51) Int. Cl.
*G01S 13/72*   (2006.01)

(52) U.S. Cl.
CPC .................................... *G01S 13/72* (2013.01)

(58) Field of Classification Search
CPC ........ G01S 13/72; G01S 13/52; G01S 13/726; G01S 13/87
See application file for complete search history.

(56) References Cited

U.S. PATENT DOCUMENTS

| 7,486,229 B1 | 2/2009 | Govoni |
| 2010/0253596 A1 | 10/2010 | Szczerba et al. |
| 2016/0103214 A1 | 4/2016 | Clark et al. |
| 2016/0231423 A1* | 8/2016 | Enderli .................... G01S 13/87 |
| 2020/0116848 A1* | 4/2020 | Brett ......................... F41J 5/052 |

FOREIGN PATENT DOCUMENTS

| EP | 3 505 958 A1 | 7/2019 |
| WO | 2009/140143 A1 | 11/2009 |

OTHER PUBLICATIONS

Barker et al. (Data Fusion Processing for the Multi-Spectral Sensor Surveillance System (M4S), 1998) (Year: 1998).*

(Continued)

*Primary Examiner* — Mohammad K Islam
(74) *Attorney, Agent, or Firm* — Browdy and Neimark, PLLC

(57) ABSTRACT

A fusion system and method for constructing fused tracks for a plurality of targets from radar detections are described. The fusion system includes a plurality of Ground Moving Target Indicator (GMTI) radars for detecting targets in an area of interest and providing GMTI plots in the form of location vectors including location data of the targets in polar coordinates. The fusion system also includes a plurality of conversion units for converting coordinates of the GMTI plots from polar coordinates to Cartesian coordinates to provide converted plots. The fusion system also includes a plurality of GMTI trackers creating preliminary GMTI tracks of the targets from the converted plots. The fusion system also includes a fused plots generator for constructing fused plots by using the converted plots and the preliminary GMTI tracks. The fusion system also includes a fused track generator for generating fused tracks for the targets from the fused plots.

20 Claims, 6 Drawing Sheets

(56) References Cited

OTHER PUBLICATIONS

Coman, et al., Evaluation of the Tracking Process in Ground Surveillance Applications, Proceedings of the 6th European Radar Conference, Rome, Italy, Sep. 30-Oct. 2, 2009, pp. 553-556.
Mallick, et al., Integrated Tracking, Classification, and Sensor Management, Theory and Applications, A John Wiley & Sons, Inc., Publication, 2012, chapter 6 p. 203-217 and chapter 9 pp. 363-373.
Bar-Shalom, et al., Estimation with Applications to Tracking and Navigation, John Wiley& Sons Inc., 2001, pp. 320-339, chapter 8.
Blackman, et al., Multiple Sensor Tracking: System Implementation and Applications, Design and Analysis of Modern Tracking Systems, Artech House, 1999, pp. 678-699, chapter 10.
Maggio, et al, Multi-Target Management, Video Tracking: Theory and Practice, John Wiley & Sons, 2011, pp. 131-159, chapter 7.
Mertens, et al., Tracking and Data Fusion for Ground Surveillance, Integrated Tracking, Classification and Sensor Management: Theory and Application, John Wiley & Sons, 2012, pp. 203-217 and pp. 363-373, chapters 6 and 9.

\* cited by examiner

SYSTEM AND METHOD FOR CONSTRUCTING FUSED TRACKS FROM RADAR DETECTIONS

TECHNOLOGICAL FIELD

The present invention generally relates to tracking of moving targets, and more particularly to tracking techniques for constructing fused tracks for a plurality of moving targets from detections received by Ground Moving Target Indicator (GMTI) radars.

BACKGROUND ART

References considered to be relevant as background to the presently disclosed subject matter are listed below:
1. "Design and Analysis of Modern Tracking Systems" by Samuel Blackman and Robert Popoli, Artech House, 1999.
2. "Estimation with Applications to Tracking and Navigation", by Yaakov Bar-Shalom, X.-Rong Li, Thiagalingam Kirubarajan, John Wiley& Sons, 2001.
3. "Video Tracking: Theory and Practice", by Emilio Maggio and Andrea Cavallaro, John Wiley& Sons, 2011.
4. "Integrated Tracking, Classification and Sensor Management: Theory and Application", by Mahendra Mallick, Vikram Krishnamurthy, and Ba-Ngu Vo., John Wiley & Sons, 2012.

Acknowledgement of the above references herein is not to be inferred as meaning that these are in any way relevant to the patentability of the presently disclosed subject matter.

BACKGROUND

Ground Moving Target Indicator (GMTI) radars detect ground moving targets, which may have a certain velocity and acceleration. Detections of a GMTI radar are usually called plots, since, in the past, primarily each detection was identified by a plot on a screen. Each plot provided from a GMTI radar includes more accurate, as well as less accurate, data. The accurate data include the radial distance between the radar and the target and the radial (Doppler) velocity of the target, while the non-accurate data include the azimuth angle of the target. In addition, the data from a GMTI radar include the estimation of appropriate errors for the values of target parameters associated with the noise, and other inaccuracies of the measurements.

In many cases, there are multiple targets in the radar's scanning area, and therefore many plots associated with the various targets in a relatively small area can be obtained. Thus, it can be difficult to construct a GMTI tracking system, which provides accurate tracks for the various targets in the scanning area from the plots generated by the radars. One of the reasons is associated with inaccurate or sometimes incorrect assignments between the existing tracks and recently received plots. Another reason is in the fact that the GMTI radar may not always identify the targets. In particular, if the targets are moving perpendicular to the beam direction of the radar (i.e., aspect angle 90°) the radar cannot "see" them. Moreover, there might be some physical obstacles such as buildings or hills within the scanning area, which can hide the targets from the radar. Furthermore, it might be that the RCS (Radar Cross Section) associated with the aspect angle of a certain target is too small. In all these cases the targets are not observable by the radar, which causes difficulties to a tracking system.

Referring to FIG. 1, a general block diagram of a prior art fusion system 10 for constructing fused tracks of ground targets (not shown) is illustrated. For simplicity, the fusion system 10 is shown for two GMTI radars. The fusion system 10 includes two GMTI radars 11 and 12, and two corresponding conversion units 17 and 18 arranged downstream of the GMTI radars. The system 10 also includes two corresponding GMTI trackers 13 and 14, arranged downstream of the conversion units 17 and 18. The fusion system 10 also includes a fusion unit 15 that provides track-to-track fusion. The fusion system 10 also includes a presentation utility 16 arranged downstream of the fusion unit 15 configured for displaying fused tracks to a user. Optionally the system may also include track presentation utilities (not shown) associated with the GMTI trackers 13 and 14 correspondingly, configured for displaying the GMTI tracks of each tracker 13 and 14.

The GMTI radars 11 and 12 are configured to provide GMTI detections in the form of GMTI plots. The conversion units 17 and 18 are configured to convert the GMTI plots from polar to Cartesian coordinates. The GMTI trackers 13 and 14 are configured to construct GMTI tracks of the targets based on the GMTI detections provided by the GMTI radars 11 and 12.

As described above, each plot includes the distance from the target to the corresponding GMTI radar, the azimuth angle, and the radial (Doppler) velocity.

The fusion unit 15 is configured to receive the GMTI tracks from the GMTI trackers 13 and 14 and to apply track-to-track procedure on the GMTI tracks, thereby to generate fused GMTI tracks.

GENERAL DESCRIPTION

The prior art systems employing a plurality of independent GMTI radars suffer from several drawbacks. One of the drawbacks is associated with the fact that the measurements obtained by the system may include various kind of noises and different time tags, i.e., the measurements from different GMTI radars can be obtained at different scanning times.

It should also be noted that track-to-track fusion used in the prior art systems is rather a complicated method, especially in an area which may have several targets. In particular, it is known that even if the assignment between two given tracks is correct, it is not straightforward to estimate the correct fused location and velocity. Moreover, even for the simplest case, where the target is moving in a straight line, the estimation of fused tracks is not precise, since the noise and uncertainties of the locations and velocities of the target in a GMTI track are not known accurately. Accordingly, in more complicated situations, for example, in the case of different types of maneuvers, the results are even less accurate.

Thus, there is still a need in the art for, and it would be useful to have, a novel fusing technique providing accurate tracks of one or more targets in an area of interest.

It would be advantageous to have a fusion system and method that is robust for scanning an area of interest which may contain physical obstacles such as buildings or hills therewithin.

The present invention addresses the deficiencies of conventional fusion systems, and provides a novel fusion system and method for constructing fused tracks for a plurality of targets located in a scanning area from the plots generated by a plurality of GMTI radars.

According to an embodiment of the present invention, the fusion system includes a plurality of Ground Moving Target Indicator (GMTI) radars. Each GMTI radar is configured and operable to perform a plurality of consequent scanning sessions for scanning the area of interest within a corresponding scanning time frame to detect a plurality of targets in the area of interest. In operation, when one scanning session ends, another scanning session starts immediately. More specifically, the scanning time frame of operation of each GMTI radar has a start scan time of scanning the area of interest and an end scan time of scanning the area of interest.

According to an embodiment, each GMTI radar provides GMTI plots in the form of location vectors including at least location data of the plurality of targets in polar coordinates.

According to an embodiment, the fusion system also includes a plurality of conversion units arranged downstream of the plurality of GMTI radars. Each conversion units is in data communication with a corresponding GMTI radar. Each conversion unit is configured to receive the GMTI plots from the corresponding GMTI radar and to convert coordinates of each GMTI plot from polar coordinates to Cartesian coordinates thereby providing converted plots.

According to an embodiment, the fusion system also includes a plurality of GMTI trackers arranged downstream of the plurality of GMTI radars. Each GMTI tracker is in data communication with a corresponding GMTI radar. Each GMTI tracker is configured to create preliminary GMTI tracks of the plurality of targets from the GMTI plots provided by the corresponding GMTI radar.

According to an embodiment, the fusion system also includes a fused plots generator arranged downstream of the memory utility in data communication therewith. The fused plots generator is configured for constructing fused plots from the converted plots and the preliminary GMTI track.

According to an embodiment, the fused plots generator includes a fused track generator configured to generate fused tracks for the plurality of targets from the fused plots.

According to some embodiments, the plurality of GMTI radars are arranged in a predetermined geometric arrangement that provides an optimal line of sight of the area of interest for each GMTI radar. The predetermined geometric arrangement can be such that the plurality of the GMTI radars are arranged at angles of 180/n between their corresponding lines of sight.

According to some embodiments, each GMTI radar of the plurality of GMTI radars provides all the GMTI plots associated with the one or more targets at the end scan time.

According to some embodiments, the location vectors are in the form $(r(t), \theta(t))$, where, $r(t)$ is the distance of a target from a corresponding GMTI radar at time $t$ within the scanning time frame of the corresponding GMTI radar, $\theta(t)$ is the azimuth angle of the target at time $t$ within the scanning time frame.

According to some embodiments, converted plots are represented by a converted location vector $(x(t), y(t))$, where $x(t)$ is the projection of the location of the target on the x-axis at a time $t$ and $y(t)$ is the projection of the location of the target on the y-axis at the time $t$. The converted plots are associated with a 2×2 covariance matrix for noise $$\begin{pmatrix} \sigma_x^2 & \sigma_x\sigma_y \\ \sigma_x\sigma_y & \sigma_y^2 \end{pmatrix}.$$

According to some embodiments, the preliminary GMTI tracks are represented by a 4 dimensional state vector $(x_{tr}(t),$ $y_{tr}(t), v_x(t), v_y(t))$, which includes a position vector $(x_{tr}(t), y_{tr}(t))$ and a velocity vector $(v_x(t), v_y(t))$, where $x_{tr}(t)$ and $y_{tr}(t)$ are coordinates of the target track on x and y-axes correspondingly, and where $v_x(t)$ and $v_y(t)$ are the velocity vector projections on the x and y-axes, correspondingly. The preliminary GMTI tracks are associated with a corresponding covariance matrix, which is a 4×4 matrix $$\begin{pmatrix} \sigma_x^2 & \sigma_x\sigma_y & \sigma_x\sigma_{v_x} & \sigma_x\sigma_{v_y} \\ \sigma_x\sigma_y & \sigma_y^2 & \sigma_y\sigma_{v_x} & \sigma_y\sigma_{v_y} \\ \sigma_x\sigma_{v_x} & \sigma_y\sigma_{v_x} & \sigma_{v_x}^2 & \sigma_{v_x}\sigma_{v_y} \\ \sigma_x\sigma_{v_y} & \sigma_y\sigma_{v_y} & \sigma_{v_x}\sigma_{v_y} & \sigma_{v_y}^2 \end{pmatrix}.$$

According to some embodiments, the plurality of GMTI radars operate sequentially, one after another.

According to some embodiments, the plurality of GMTI radars operate concurrently such that their scanning time frames at least partially overlap.

According to some embodiments, at least one of the plurality of GMTI radars is the last to end a scanning session.

According to an embodiment, the fused plots generator includes a last plot determination unit configured to receive the converted plots obtained from each scanning session of each GMTI radar and to determine, for each GMTI radar, which of the converted plots are obtained from its last session.

According to some embodiments, the fused plots generator also includes a prediction unit, arranged downstream of the last plot determination unit, configured to generate predicted plots based on the converted plots and the preliminary GMTI tracks by assigning a common time tag to all the converted plots from all the GMTI radars, wherein the predicted plots are in the form of predicted location vectors indicative of locations of the plurality of targets.

Specifically, the predicted location vectors are constructed by advancing each converted plot (updating converted location vectors) to a common time $t_p$, thereby assigning the common time tag to all the converted plots from all the GMTI radars.

According to some embodiments, the fused plots generator also includes an assignment unit configured to assign the predicted plots from the plurality of GMTI radars to corresponding targets from the plurality of targets.

According to some embodiments, the fused plots generator also includes a fusion unit configured to construct fused plots for the plurality of the targets from corresponding predicted plots.

According to some embodiments, the predicted location vectors are in the form of $S=(x_p(t_p), y_p(t_p))$, where $t_p$ is the end scan time of the radar which is the last to end a scanning session, to which the converted plots are advanced, and where $x_p(t_p)$ and $y_p(t_p)$ are predicted location projections of the target on the x and y axis correspondingly at the common time $t_p$.

It should be noted that each predicted location vector is associated with a corresponding covariance error matrix $$M_i = \begin{pmatrix} \sigma_{x_p}^2 & \sigma_{x_p}\sigma_{y_p} \\ \sigma_{x_p}\sigma_{y_p} & \sigma_{y_p}^2 \end{pmatrix}$$

where i=1, 2, ... n, where n is the number of the GMTI radars in the plurality of radars.

According to some embodiments, the predicted location projections of the target $x_p(t_p)$ and $y_p(t_p)$ are calculated by using the equations:

$$x_p(t_p) = x(t) + v_x(t) \cdot (t_p - t)$$

$$y_p(t_p) = y(t) + v_y(t) \cdot (t_p - t).$$

According to some embodiments, each fused plot is constructed from the predicted plots which are assigned to a certain target. The fused plots can be represented by corresponding fused location vectors $f=(x_f, y_f)$, where $x_f$ and $y_f$ are the fused location projections of the target on the x and y axis, correspondingly.

According to some embodiments, each fused plot is calculated by:

$$f = F \cdot \left( M_1^{-1} \cdot S_1 + M_2^{-1} \cdot S_2 + \cdots + M_n^{-1} \cdot S_n \right),$$

where $S_1, S_2, \ldots, S_n$ are predicted location vectors associated with the plurality of GMTI radars $(R_1, R_2, \ldots,$ and $R_n)$, assigned to the certain target, and $M_1^{-1}, M_2^{-1}, \ldots, M_n^{-1}$ are the inverse covariance error matrices associated with the predicted location vectors $S_1, S_2, \ldots, S_n$, correspondingly, and F is the fused covariance matrix, which is calculated by using the equation:

$$F = \frac{1}{M_1^{-1} + M_2^{-1} + \cdots + M_n^{-1}}.$$

According to some embodiments, the system may also include a memory utility coupled to the plurality of conversion units and the plurality of GMTI radars, the memory utility including a database configured for receiving the converted plots and the preliminary GMTI tracks, and storing the GMTI plots and the preliminary GMTI tracks in the database.

According to some embodiments, the system may also include a fused tracks presentation utility arranged downstream of the fused track generator in data communication with the fused track generator. The fused tracks presentation utility is configured for receiving the fused tracks from the fused track generator and for displaying the fused tracks to a user.

According to another general aspect of the present invention, there is provided a method for constructing fused tracks for a plurality of targets from radar detections.

The method includes performing a plurality of scanning sessions for scanning an area of interest within a corresponding scanning time frame by a plurality of Ground Moving Target Indicator (GMTI) radars configured for detecting the plurality of targets in an area of interest. The plurality of GMTI radars provide GMTI plots in the form of location vectors. The location vectors include at least location data of the plurality of targets in polar coordinates.

According to some embodiments, the method also includes operating the GMTI radars sequentially, one after another.

According to some embodiments the method also includes operating the GMTI radars concurrently such that their scanning time frames at least partially overlap.

The method also includes converting coordinates of the GMTI plots from polar coordinates to Cartesian coordinates, thereby providing converted plots.

Then, the method includes creating preliminary GMTI tracks of the plurality of targets from the GMTI plots.

The method further includes constructing fused plots from the converted plots and the preliminary GMTI tracks. Then, fused tracks for the plurality of targets are generated from the fused plots.

According to some embodiments, constructing of the fused plots includes receiving the converted plots obtained from each scanning session of each GMTI radar and determining, for each GMTI radar, which of the converted plots are obtained from its last session;

According to some embodiments, the method also includes generating the predicted plots based on the converted plots and the preliminary GMTI tracks by assigning a common time tag to all the converted plots from all the GMTI radars, as described above.

According to some embodiments, the method further includes assigning the predicted plots associated with GMTI radars to corresponding targets from the plurality of targets and constructing the fused plots for the plurality of the targets from the corresponding predicted plots.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
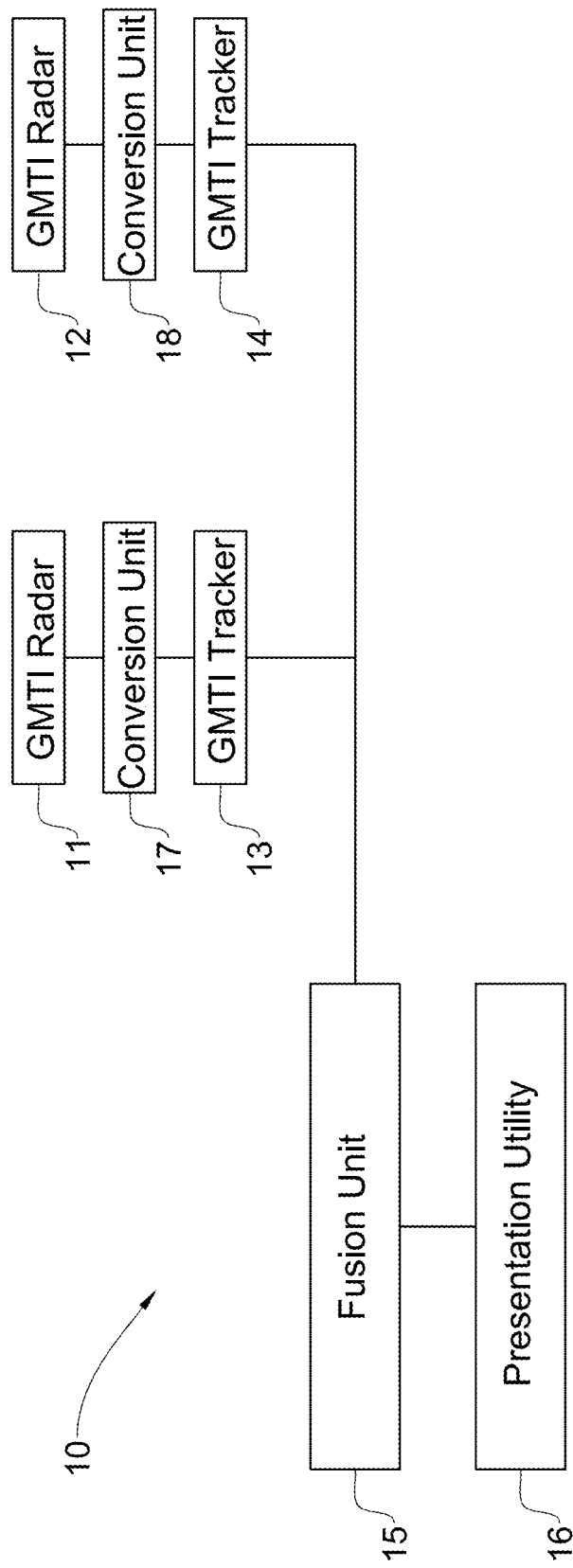
FIG. 1 illustrates a schematic block diagram of a prior art fusion system for constructing fused tracks of ground targets.

The principles and operation of the fusion system and method for constructing tracks for a plurality of targets according to the present invention may be better understood with reference to the drawings and the accompanying description, it being understood that these drawings and examples in the description are given for illustrative purposes only and are not meant to be limiting. The same reference Roman numerals and alphabetic characters will be utilized for identifying those components which are common in the positioning system and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Unless specifically stated otherwise, throughout the description, utilizing terms such as "computing" or "calculating" or "determining" or "obtaining" or the like, refer to the action and processes of a computer system, or similar electronic processing device, that manipulates and transforms data.

Figure 2:
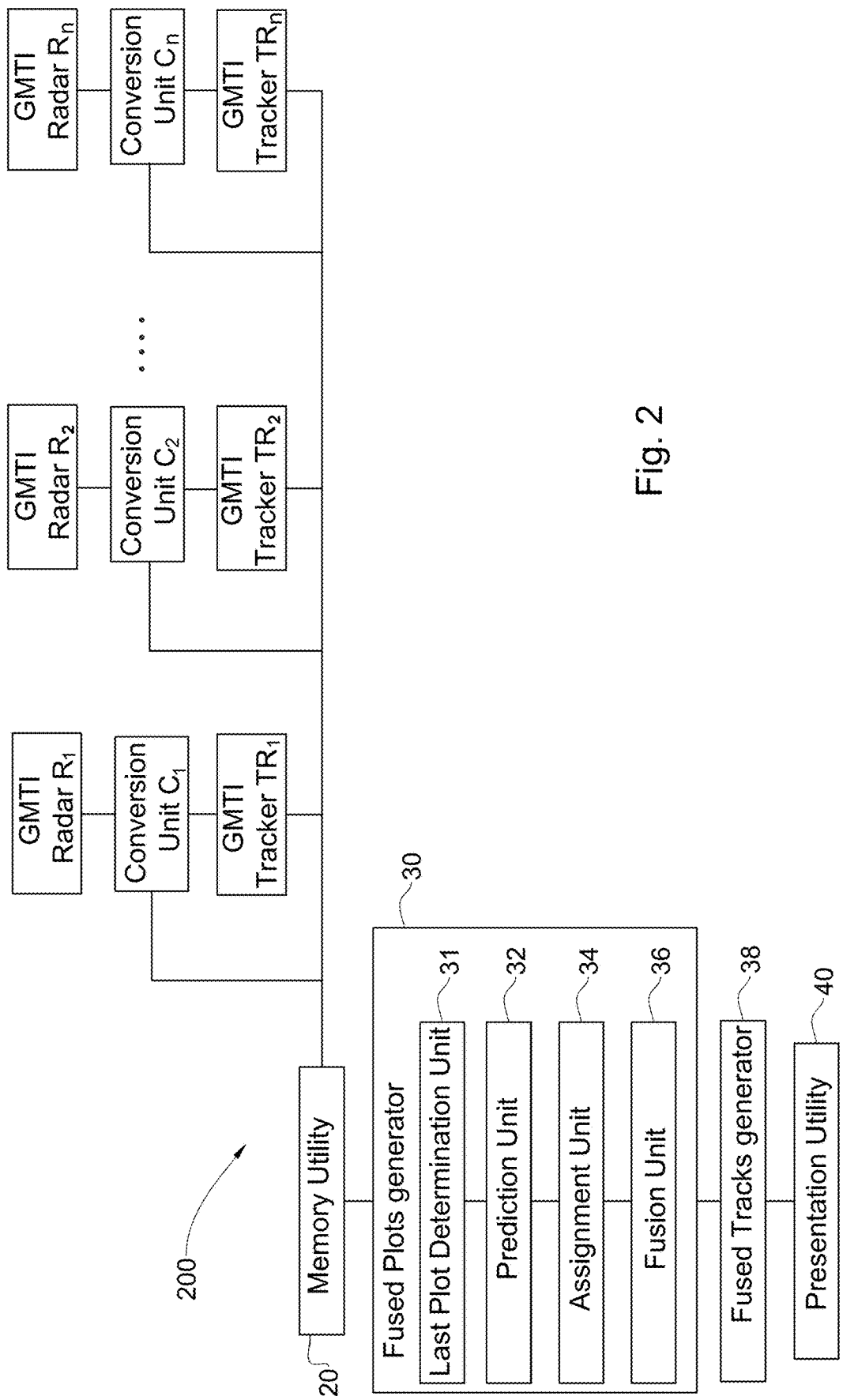
FIG. 2 illustrates a schematic block diagram of a fusion system configured for constructing tracks of a plurality of targets, according to an embodiment of the present invention.

Referring to FIG. 2, a schematic block diagram of a fusion system 200 configured for constructing tracks of a plurality of targets (not shown) is illustrated, according to an embodiment of the present invention. The fusion system includes a plurality of Ground Moving Target Indicator (GMTI) radars $R_1, R_2, \ldots$, and $R_n$ configured and operable for scanning an area of interest in which the plurality of targets are located and to provide GMTI detections, in the form of GMTI plots. The fusion system 200 also includes a plurality of conversion units $C_1, C_2, \ldots$, and $C_n$ arranged downstream of the plurality of GMTI radars $R_1, R_2, \ldots$, and $R_n$. Each conversion unit is in data communication with the corresponding GMTI radar. Each conversion unit is configured to receive the GMTI plots from the corresponding GMTI radar and to convert coordinates of each GMTI plot from polar coordinates to Cartesian coordinates, thereby providing converted plots.

The fusion system 200 also includes a plurality of corresponding GMTI trackers $TR_1, TR_2, \ldots$, and $TR_n$ arranged downstream of the plurality of conversion units $C_1, C_2, \ldots$, and $C_n$ in data communication with the corresponding conversion units $C_1, C_2, \ldots$ and $C_n$. The GMTI trackers $TR_1, TR_2, \ldots$, and $TR_n$ are configured for constructing preliminary GMTI tracks for each target of the plurality of targets within the area of interest based on the provided converted plots. The fusion system 200 also includes a memory utility 20 arranged downstream of the plurality of GMTI trackers configured for receiving the converted plots from the plurality of conversion units $C_1, C_2, \ldots$, and $C_n$ and the preliminary GMTI tracks from the GMTI trackers $TR_1, TR_2, \ldots$, and $TR_n$. The fusion system 200 also includes a fused plots generator 30 arranged downstream of the memory utility in data communication therewith configured to receive the converted plots and the preliminary GMTI tracks from the memory utility 20 and to construct fused plots.

According some embodiments, the GMTI radars can be arranged in a predetermined geometric arrangement that provides an optimal line of sight of the area of interest for each GMTI radar. According to an embodiment of the present invention, the GMTI radars can be arranged having an angle of 180/n between their corresponding lines of sight, however, other arrangements are also contemplated.

Figure 3A:
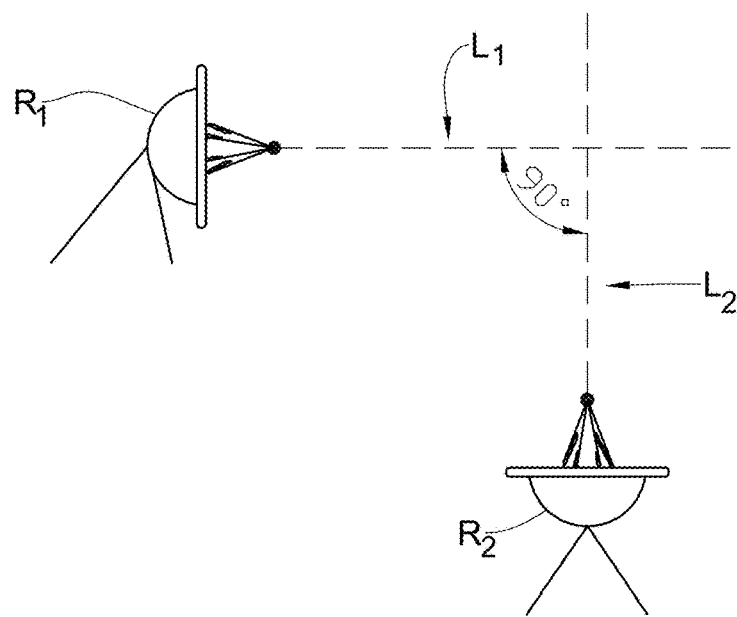
FIGS. 3A and 3B show arrangements of two and three GMTI radars, correspondingly, for the system shown in FIG. 2, according to some embodiments of the present invention.
Figure 3B:
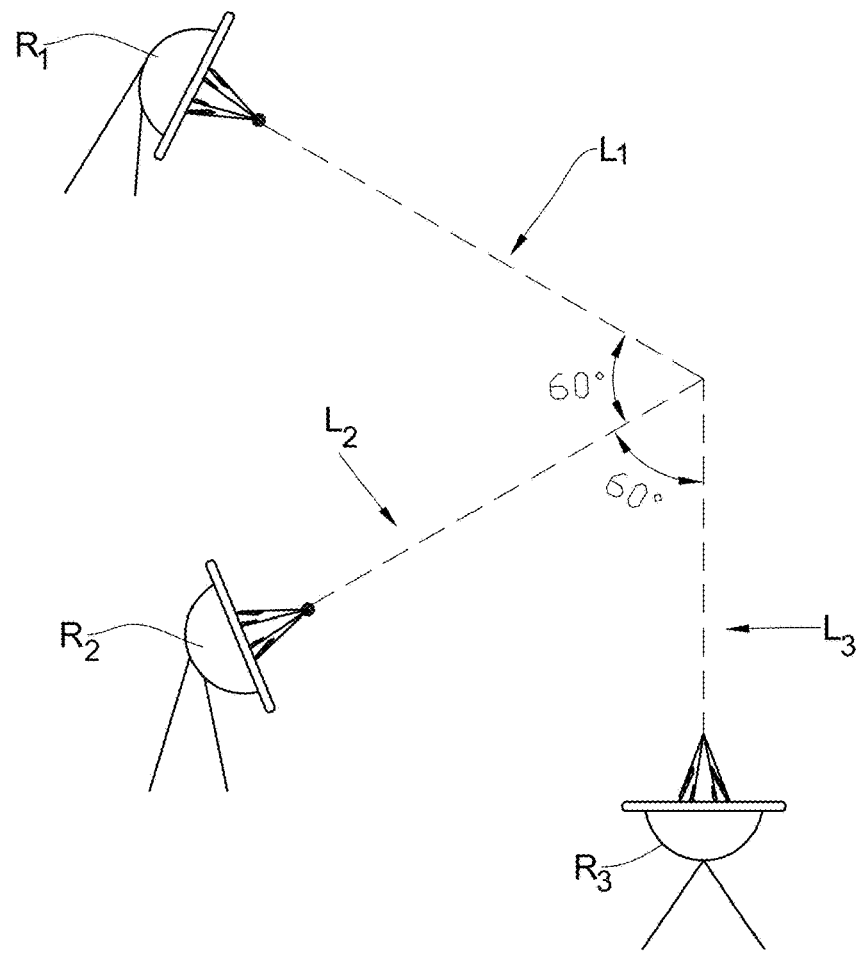

Referring to FIGS. 3A and 3B together, arrangements of two and three GMTI radars for the system (200 in FIG. 2) are illustrated, correspondingly. As shown in FIG. 3A, the fusion system includes two GMTI radars $R_1$ and $R_2$ having lines of sight $L_1$ and $L_2$ correspondingly. In this case, the lines of sight $L_1$ and $L_2$ of the GMTI radars $R_1$ and $R_2$ are directed at angles of about 90°.

As shown in FIG. 3B, the fusion system includes three GMTI radars $R_1$, $R_2$ and $R_3$ having lines of sight $L_1$, $L_2$ and $L_3$, correspondingly. As can be seen, lines of sight $L_1$, $L_2$ and $L_3$ of the GMTI radars $R_1$, $R_2$ and $R_3$ are directed at angles of about 60°.

Turning back to FIG. 2, according to an embodiment of the present invention, the GMTI radars $R_1, R_2, \ldots$, and $R_n$ can operate sequentially one after another. In this case, the scanning time frames of operation of the GMTI radars $R_1, R_2, \ldots$, and $R_n$ do not overlap, or partially overlap.

According to another embodiment of the present invention, the GMTI radars $R_1, R_2, \ldots$, and $R_n$ operate concurrently such that their scanning time frames can overlap, or at least partially overlap.

According to an embodiment of the present invention, each GMTI radar is configured to perform a plurality of consequent scanning sessions. In operation, when one scanning session ends, another scanning session starts immediately. Each scanning session is performed within a predetermined scanning time frame. Specifically, the scanning time frame $[T_{si}; T_{ei}]$ of the scanning session of the i-th GMTI radar $R_i$ (where i=1, 2, ..., n) has a corresponding start scan time $T_{si}$ of scanning the area of interest which is the time at which the i-th GMTI radar starts a scanning session, and a corresponding end scan time $T_{ei}$ at which the i-th GMTI radar ends the scanning session and at which the i-th GMTI radar provides a plurality of GMTI plots. In other words, each GMTI radar provides a plurality of GMTI plots at the end of each scanning session, i.e., end scan time $T_{ei}$.

After completing one scanning session, the i-th GMTI radar $R_i$ can perform a new scanning session immediately having the same scanning time frame $[T_{si}; T_{ei}]$.

Each GMTI plot is associated with a certain target detected within the area of interest at a certain time t within the scanning time frame (i.e. $T_{si} \leq t \leq T_{ei}$) of a corresponding scanning session of the corresponding GMTI radar. Accordingly, each GMTI plot of the i-th GMTI radar $R_i$ is characterized by a corresponding time tag, which is equal to the time t at which the target associated with this GMTI plot is detected by the i-th GMTI radar $R_i$.

For example, the i-th GMTI radar $R_i$ performs a scanning session in a scanning time frame $[T_{si}; T_{ei}]$, namely from the time $T_{si}$ to the time $T_{ei}$. During the scanning time frame $[T_{si}; T_{ei}]$, the radar $R_i$ detects one or more targets in the area of interest within the scanning time frame $[T_{si}; T_{ei}]$ and provides the GMTI plots associated with these targets at the time $T_{ei}$. Each GMTI plot is associated with a certain target detected in the area of interest at certain time t within the scanning time frame $[T_{si}; T_{ei}]$.

After completing a scanning session and providing the GMTI plots, the i-th GMTI radar $R_i$ starts a further consequent scanning session.

In operation of the GMTI radars $R_1, R_2, \ldots,$ and $R_n$, at least one of the radars ends its scanning session after all the other radars. In other words at least one of the radars is the latest to end scanning session. For the purpose of the present invention, such a GMTI radar that ends scanning session after all the other radars is referred to as the "last radar".

Accordingly, when the i-th GMTI radar $R_i$ is the last to end its scanning session, the time $T_{ei}$ when it ends this scanning session, is larger than the time, when the other radars end their scanning sessions, i.e., $T_{ei} > T_{e1}, T_{e2}, \ldots, T_{ei-1}, T_{ei+1}, \ldots, T_{en}$.

It should be noted that, if the i-th GMTI radar $R_i$ is the last to end a scanning session then at least one other GMTI radar $R_j$, which ends its scanning session before radar $R_i$ (i.e., $T_{ej} < T_{ei}$), may complete one or more scanning sessions before $T_{ei}$. In particular, more than one scanning sessions may be in the case when each scanning session of the radar $R_j$ is so short that several scanning sessions may be completed during the scanning session of the radar i-th GMTI radar $R_i$. In this case, the last scanning session performed by GMTI radar $R_j$ within the scanning time frame $[T_{sj}; T_{ej}]$ of the GMTI radar $R_i$, is referred to as the "last session" of the GMTI radar $R_j$. As mentioned above, each GMTI plot is associated with a certain target in the area of interest. Each GMTI plot is obtained at a certain time t within the scanning time frame of a scanning session of the corresponding GMTI radar. Each GMTI plot can include radial (Doppler) velocity $v_D(t)$ of the target at a certain time t within the scanning time frame of the corresponding GMTI radar and location data, which can be represented by a location vector $(r(t), \theta(t))$, wherein, $r(t)$ is the distance of a target from the corresponding GMTI radar at time t within the scanning time frame of the corresponding GMTI radar, $\theta(t)$ is the azimuth angle of a target at time t within the scanning time frame.

For example, in operation, the i-th GMTI radar $R_i$ performs one or more consequent scanning sessions. In each scanning session, the i-th GMTI radar $R_i$ detects one or more targets in the area of interest. Upon completion of each scanning session the i-th GMTI radar $R_i$ provides the GMTI plots associated with these targets at the time $T_{ei}$. Accordingly, each plot associated with the GMTI radar $R_i$ is represented by a corresponding location vector $(r(t), \theta(t))_i$.

Each conversion unit, selected from $C_1, C_2, \ldots,$ and $C_n$, is configured to receive the GMTI plots from the corresponding GMTI radar, selected from $R_1, R_2, \ldots,$ and $R_n$, and to convert polar coordinates of these GMTI plots into the corresponding Cartesian coordinates. More specifically, each conversion unit is configured to convert polar coordinates of the location vector $(r(t), \theta(t))$ (indicative of the location data) associated with these plots into Cartesian coordinates. For the purpose of the present invention, the GMTI plots which are converted into Cartesian coordinates are referred to as "converted plots".

Accordingly, for the purpose of the present invention, each converted plot can be represented by a converted location vector $(x(t), y(t))$ where $x(t)$ and $y(t)$ are the projections of the location of the target on the x and y-axes, correspondingly, at a certain time t within the scanning time frame of the corresponding GMTI radar.

For example, the i-th conversion unit $C_i$ is configured to receive GMTI plots from the corresponding i-th GMTI radar $R_i$, and to convert the polar coordinates of the location vectors $(r(t), \theta(t))_i$ associated the GMTI plots of the GMTI radar $R_i$ to Cartesian coordinates. In this case, the converted plots are represented by a converted location vectors $(x(t), y(t))_i$.

Accordingly, the location of a target is represented by a two dimensional converted location vector $(x(t), y(t))$, which is also associated with a 2×2 covariance matrix for the noise $$\begin{pmatrix} \sigma_x^2 & \sigma_x\sigma_y \\ \sigma_x\sigma_y & \sigma_y^2 \end{pmatrix}, \quad (1)$$

where $\sigma_x$ and $\sigma_y$ are the corresponding variances of x and y. The covariance matrix is indicative of the clutter ellipse of each GMTI radar associated with noise.

As shown in FIG. 2, the plurality of GMTI trackers $TR_1$, $TR_2, \ldots,$ and $TR_n$ are in data communication with the corresponding conversion units $C_1, C_2, \ldots,$ and $C_n$ for receiving converted plots therefrom. Each GMTI tracker is configured for constructing preliminary GMTI tracks for each target of the plurality of targets within the area of interest based on the provided converted plots. It should be noted, that the term "preliminary GMTI tracks" used in the present disclosure refers to the tracks which are obtained by the GMTI trackers, on the basis of the converted plots provided by the conversion unit $C_1, C_2, \ldots,$ and $C_n$.

Each state in the preliminary GMTI track is represented by a 4 dimensional state vector $(x_{tr}(t), y_{tr}(t), v_x(t), v_y(t))$, which includes a position vector $(x_{tr}(t), y_{tr}(t))$ and a velocity vector $(v_x(t), v_y(t))$, where $x_{tr}(t)$ and $y_{tr}(t)$ are coordinates of the target track on the x and y-axes, correspondingly, at a certain time t within the scanning time frame of the corresponding GMTI radar, and $v_x(t)$ and $v_y(t)$ are velocity vector projections on the x and y-axes, correspondingly, at that time t.

Each state in the preliminary GMTI track is also associated with a corresponding covariance matrix, which is a 4×4 matrix $$\begin{pmatrix} \sigma_x^2 & \sigma_x\sigma_y & \sigma_x\sigma_{v_x} & \sigma_x\sigma_{v_y} \\ \sigma_x\sigma_y & \sigma_y^2 & \sigma_y\sigma_{v_x} & \sigma_y\sigma_{v_y} \\ \sigma_x\sigma_{v_x} & \sigma_y\sigma_{v_x} & \sigma_{v_x}^2 & \sigma_{v_x}\sigma_{v_y} \\ \sigma_x\sigma_{v_y} & \sigma_y\sigma_{v_y} & \sigma_{v_x}\sigma_{v_y} & \sigma_{v_y}^2 \end{pmatrix}, \quad (2)$$

where $\sigma_x, \sigma_y, \sigma_{v_x},$ and $\sigma_{v_y}$ are the variances of the corresponding variables $x_{tr}(t), y_{tr}(t), v_x(t), v_y(t)$.

When desired, the system 200 may include track presentation utilities (not shown) associated with the GMTI tracker, correspondingly, which are configured for displaying the preliminary GMTI tracks of each tracker to a user of the system 200.

According to an embodiment of the present invention, the memory utility 20 includes a database (not shown) coupled to the conversion units $C_1, C_2, \ldots,$ and $C_n$ and to the GMTI trackers $TR_1, TR_2, \ldots TR_n$. The memory utility 20 is configured for receiving all the converted plots provided by the plurality of conversion units $C_1, C_2, \ldots,$ and $C_n$ and the preliminary GMTI tracks provided by the GMTI trackers $TR_1, TR_2, \ldots TR_n$, and for storing the converted plots and the preliminary GMTI tracks in the database.

The fused plots generator 30 is arranged downstream of the memory utility 20, and is coupled (by wires or wirelessly) to the memory utility 20 for data communication therebetween. The fused plots generator 30 is configured to receive the converted plots and the preliminary GMTI tracks from the memory utility 20 and to construct fused plots.

According to an embodiment of the invention, the fused plots generator 30 includes a last plot determination unit 31, a prediction unit 32, an assignment unit 34 arranged downstream of the prediction unit 32, and a fusion unit 36 arranged downstream of the assignment unit 34.

According to an embodiment of the invention, the last plot determination unit 31 is configured to receive all the converted plots obtained from each scanning session of each GMTI radar and to determine, for each GMTI radar, which of the converted plots are obtained from its last session. The last plot determination unit 31 is also configured to provide these converted plots along with the corresponding preliminary GMTI tracks associated with these converted plots to the prediction unit 32.

It should be understood that, the last session of each GMTI radar, which is not the last radar, is the scanning session which is completed before the last radar ends its scanning session.

Each converted plot is obtained at a corresponding time t within the scanning time frame of the last session of the corresponding GMTI radar.

According to an embodiment, the last plot determination unit 31 is also configured to utilize only "recent" converted plots, i.e., the converted plots which are obtained during a predetermined time interval $T_a \leq t \leq T_e$, where $T_a$ is the time which, is relatively close to the end scan time $T_e$ of the session. The "earlier" converted plots obtained before the time $T_a$ are ignored by the last plot determination unit 31. For example, such a predetermined time interval can be in the range of 25-30 sec. The converted plots which are obtained within the predetermined time interval $T_a \leq t \leq T_e$ are provided to the prediction unit 32 along with the corresponding preliminary GMTI tracks associated with these converted plots.

According to an embodiment of the invention, the prediction unit 32 is configured to receive the converted plots and the preliminary GMTI tracks from the last plot determination unit 31 and to generate "predicted plots". As described above, each converted plot has its corresponding time tag at which the target associated with this plot is detected. The predicted plots are indicative of estimated locations of the plurality of targets at a certain time. This time is selected from the scanning time frame of the last radar, i.e. the radar which is last to end a scanning session. This time is common for all the predicted plots associated with all the GMTI radars $R_1, R_2, \ldots,$ and $R_n$. According to an embodiment, such a common time is the end scan time of the GMTI radar, selected from $R_1, R_2, \ldots,$ and $R_n$, which is the last to end a scanning session.

For each GMTI radar, the predicted plots are constructed by advancing each converted plot associated with this GMTI radar (i.e. updating converted location vectors of each converted plot) to a common time which is the end scan time of the last radar (i.e. which is last to end a scanning session), thereby assigning a common time tag to all the converted plots.

Specifically, the updating of the converted location vectors of the converted plots includes constructing predicted location vectors which are constructed by advancing the converted location vectors to a common time $t_p$ which is the end scan time of the GMTI radar which is the last to end a scanning session, thus assigning a common time tag to all the converted plots originated from all the GMTI radars.

For the purpose of the present invention, the predicted location vectors are in the form of $S=(x_p(t_p), y_p(t_p))$, where $t_p$ is the common time to which the converted plots are advanced. According to an embodiment, the common time $t_p$ is an end scan time of the radar, which is last to end a scanning session and, $x_p(t_p)$ and $y_p(t_p)$ are the predicted location projections of the target on the x and y axis, correspondingly, at the common time $t_p$.

Each predicted location vector $S_i$ related to the i-the GMTI radar is associated with a corresponding covariance error matrix $M_i$, $$M_i = \begin{pmatrix} \sigma_{x_p}^2 & \sigma_{x_p}\sigma_{y_p} \\ \sigma_{x_p}\sigma_{y_p} & \sigma_{y_p}^2 \end{pmatrix}, \tag{3}$$

where i=1, 2, . . . n, where n is the number of the GMTI radars in the plurality of radars.

In order to construct the predicted plots, the prediction unit 32 utilizes a prediction model. The prediction model uses data of the location projections x(t) and y(t) of a target at a certain time t, which is within the scanning time frame of the corresponding GMTI radar and the velocity of the target at the time t. The location projections x(t) and y(t) are obtained from the converted location vectors (x(t), y(t)).

According to an embodiment of the present invention, the velocity vector projections $v_x(t)$ and $v_y(t)$ are obtained from the corresponding state vector $(x_{tr}(t), y_{tr}(t), v_x(t), v_y(t))$.

Since the time intervals between the GMTI plots are usually up to a few seconds, the velocity is assumed to be constant. Accordingly, the components $x_p(t_p)$ and $y_p(t_p)$ of each predicted location vector S can be estimated by using the equations:

$$x_p(t_p) = x(t) + v_x(t) \cdot (t_p - t) \tag{4a}$$

$$y_p(t_p) = y(t) + v_y(t) \cdot (t_p - t), \tag{4b}$$

where x(t) and y(t) are the location projections of the target on the x and y axis, correspondingly, obtained from the corresponding converted plot, and $t_p$ is the last end scan time, namely the end scan time of the last radar.

According to an embodiment, the last radar is $R_n$. Thus, the end scan time of this last radar $R_n$ is $T_{en}$ (i.e., $t_p=T_{en}$). In this case, the prediction unit 32 is configured to "advance" all the converted plots of all the GMTI radars received from the last plot determination unit 31 to the time $T_{en}$. In other words, the corresponding converted location vectors of these converted plots are updated to the common time $T_{en}$ of the radar $R_n$.

For Example, each predicted location vector which is associated with the i-th GMTI radar $R_i$ can be represented in the form of $S_i=(x_p(T_{en}), y_p(T_{en}))$. According to an embodiment, the components $x_p(T_{en})$ and $y_p(T_{en})$ of the predicted location vector $S_i$ can be calculating by using the equations:

$$x_p(T_{en}) = x(t) + v_x(t) \cdot (T_{en} - t) \tag{5a}$$

$$y_p(T_{en}) = y(t) + v_y(t) \cdot (T_{en} - t) \tag{5b}$$

As a result of the above calculations, the prediction unit 32 generates predicted plots having a common time tag, which is the end scan time of the last radar (i.e., the radar which is the last to stop operating).

According to an embodiment, all the converted plots originated from the last radar $R_n$, which are obtained at any time $t \neq T_{en}$ within the scanning time frame $[T_{sn}; T_{en}]$, are also advanced to the time $T_{en}$.

As described above, if the radar $R_n$ is the last to end a scanning session, then any other GMTI radar $R_j$, which ends its scanning session before radar $R_n$ (i.e., $T_{ej} < T_{en}$), may complete more than one scanning sessions before $T_{en}$. Accordingly, the prediction unit 32 receives only the converted plots which are obtained from the last session of each radar $R_j$. Thus, the predicted plots for each radar $R_j$ are constructed based only on these converted plots which are obtained from the last session of each radar $R_j$.

According to an embodiment, the predicted plots, for each radar, are constructed from the converted plots which are obtained during a predetermined time interval $T_a \leq t \leq T_{en}$, where $T_a$ is the time which relatively close to the end scan time $T_{en}$ of the scanning session of the radar which is last to end a scanning session $R_n$. As mentioned above, such a predetermined time interval can, for example, be in the range of 25-30 sec.

In the case when, the scanning session of the last radar $R_n$ is longer than the predetermined time interval, only the converted plots obtained during the interval $T_a \leq t \leq T_{en}$ within the scanning time frame $[T_{sn}; T_{en}]$, should be advanced to the time $T_{en}$.

According to an embodiment, the assignment unit 34 is configured to assign the predicted plots to the corresponding targets detected by the GMTI radars $R_1, R_2, \ldots$, and $R_n$ by applying an assignment procedure. In the assignment procedure, each target which is detected by different GMTI radars, is assigned to the corresponding predicted plots.

The assignment procedure used in the present invention can, for example, be the "Munkres" assignment procedure, known per se. However, other assignment procedures can also be used for the purpose of the present invention.

In the "Munkres" assignment procedure, the assignment unit 34 constructs a matrix in which the rows are the data corresponding to the predicted plots from the last radar and the columns are the data corresponding to the predicted plots of the other radars. In particular, the matrix elements are the statistical distances between the plots. For determining which of the pairs of the plots are associated the Munkres procedure calculates the total minimum cost which determines the associated pairs of plots.

According to an embodiment of the present invention, the fusion unit 36 is configured to construct fused plots. Each fused plot includes location data associated with a certain target.

According to an embodiment, each fused plot is associated with a certain target and constructed from the predicted plots which are assigned to that target. The fused plots can be represented by corresponding fused location vectors $f=(x_f, y_f)$, where $x_f$ and $y_f$ are the fused location projections of the target on the x and y axis.

According to an embodiment, each fused plot is calculated by:

$$f = F \cdot (M_1^{-1} \cdot S_1 + M_2^{-1} \cdot S_2 + \cdots + M_n^{-1} \cdot S_n), \qquad (6)$$

where $S_1, S_2, \ldots, S_n$ are predicted location vectors of the predicted plots associated with the GMTI radars $R_1, R_2, \ldots, R_n$, correspondingly, assigned to a certain target, and $M_1^{-1}, M_2^{-1}, \ldots, M_n^{-1}$ are the inverse covariance error matrices associated with the predicted location vectors $S_1, S_2, \ldots, S_n$, correspondingly, and F is the fused covariance matrix, which is calculated by using the equation:

$$F = \frac{1}{M_1^{-1} + M_2^{-1} + \cdots + M_n^{-1}}. \qquad (7)$$

According to an embodiment of the present invention, the fusion system 200 also includes a fused track generator 38 arranged downstream of the fused plots generator 30. The fused track generator 38 is configured to receive the fused tracks from the fused plots generator 30 and to generate fused tracks for the plurality of targets from the fused plots.

According to an embodiment of the present invention, the fused track generator 38 includes a tracker (not shown) that is configured for generating fused tracks for the plurality of targets. The tracker can, for example, be any known tracker. The fused tracks are generated on the basis of the fused plots.

According to an embodiment of the invention, the system 200 may further include a fused tracks presentation utility 40 arranged downstream of the fused track generator 38. The fused tracks presentation utility 40 is configured for receiving the fused tracks from the fused track generator 38 and for displaying the fused tracks to a user.

Figure 4:
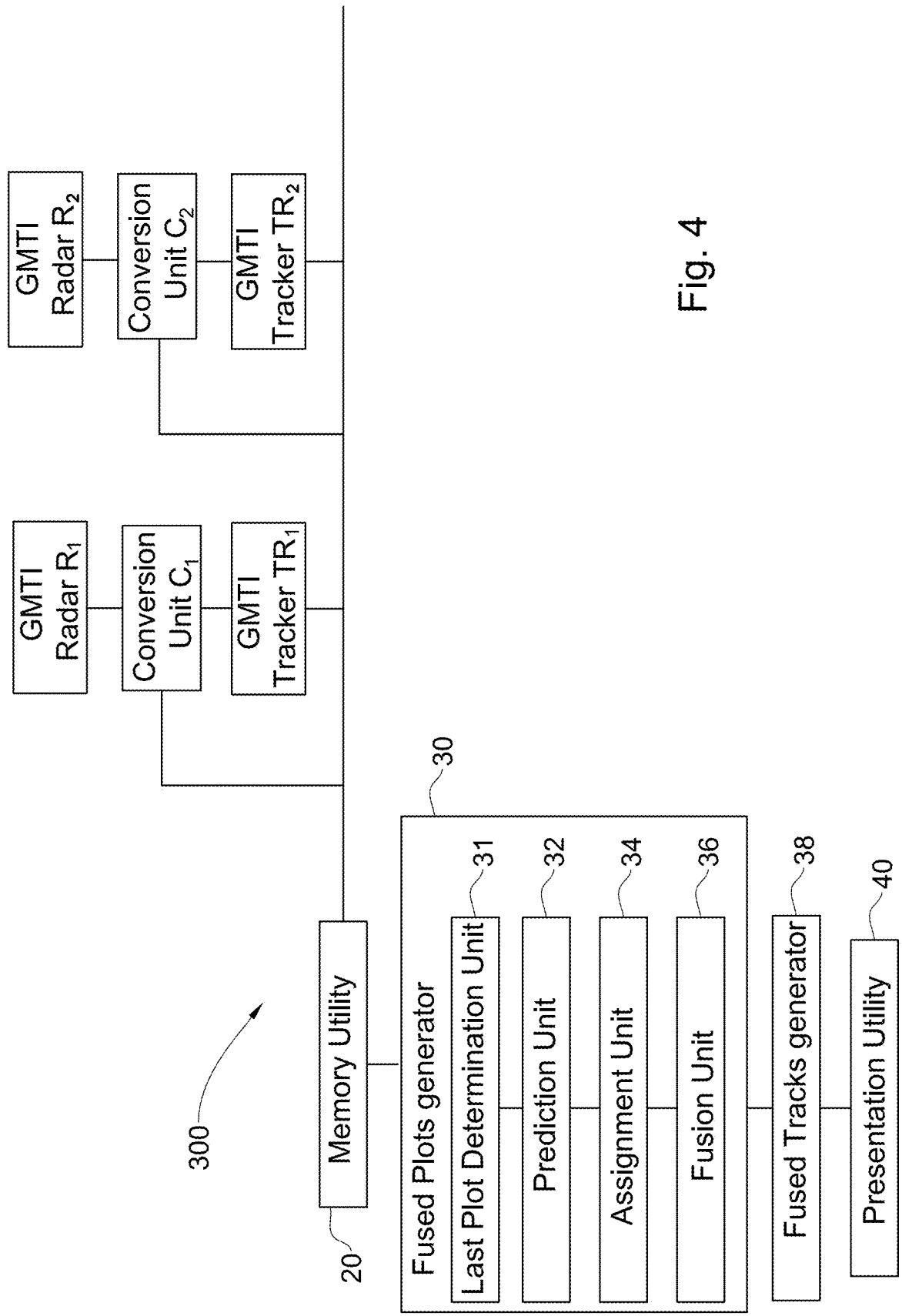
FIG. 4 illustrates a schematic block diagram of a fusion system configured for constructing tracks of a plurality of targets, according to another embodiment of the present invention.

Referring to FIG. 4, a schematic block diagram of a fusion system 300 configured for constructing tracks of a plurality of targets (not shown) is illustrated, according to a further embodiment of the present invention. The fusion system 300 differs from the system shown in FIG. 2 by the fact that it includes only two GMTI radars $R_1$ and $R_2$.

The GMTI radars $R_1$ and $R_2$ are configured and operable for scanning an area of interest, within a corresponding scanning time frame, in which the plurality of targets are located, and to provide GMTI detections in the form of GMTI plots. The fusion system 300 also includes two conversion units $C_1$ and $C_2$ arranged downstream of GMTI radars $R_1$ and $R_2$ in data communication with the corresponding GMTI radars $R_1$ and $R_2$ configured to receive the GMTI plots from the corresponding GMTI radars $R_1$ and $R_2$, and to convert coordinates associated with each GMTI plot from polar coordinates to Cartesian coordinates, thereby providing converted plots.

The fusion system 300 also includes two corresponding GMTI trackers $TR_1$ and $TR_2$ arranged downstream of the conversion units $C_1$ and $C_2$ in data communication with the corresponding conversion units $C_1$ and $C_2$ configured for constructing preliminary GMTI tracks for each target of the plurality of targets within the area of interest based on the provided converted plots. The fusion system 300 also includes a memory utility 20 arranged downstream of the GMTI trackers $TR_1$ and $TR_2$ configured for receiving the converted plots from the conversion units $C_1$ and $C_2$ and the preliminary GMTI tracks from the GMTI trackers $TR_1$ and $TR_2$. The fusion system 300 also includes a fused plots generator 30 arranged downstream of the memory utility in data communication therewith configured to receive the converted plots and the preliminary GMTI tracks from the memory utility 20 and to construct fused plots.

Referring to FIG. 3A, an arrangement of the GMTI radars $R_1$ and $R_2$ is illustrated, correspondingly, according to an embodiment of the present invention. According to this embodiment, the GMTI radars $R_1$ and $R_2$ are spatially arranged at right angles between their lines of sight $L_1$ and $L_2$. It should be noted that such an arrangement provides an optimal line of sight of the area of interest for each GMTI radar.

According to one embodiment, the GMTI radars $R_1$ and $R_2$ operate sequentially in time, i.e., one after another. In this case, the scanning time frames of operation of the GMTI radars $R_1$ and $R_2$ do not overlap, or partially overlap.

According to another embodiment of the present invention, the GMTI radars $R_1$ and $R_2$ operate concurrently, such that their scanning time frames can overlap, or at least partially overlap.

According to an embodiment of the present invention, the GMTI radars $R_1$ and $R_2$ are configured to perform a plurality of scanning sessions. Each scanning session is performed within a predetermined scanning time frame. Specifically, the scanning time frame of a scanning session of each GMTI radar $R_1$ and $R_2$ has a start scan time of scanning the area of interest $T_{s1}$ and $T_{s2}$ correspondingly, which is the time at which the GMTI radars $R_1$ and $R_2$ start their scanning session, and a corresponding end scan time $T_{e1}$ and $T_{e2}$ of the scanning the area of interest, at which the GMTI radars $R_1$ and $R_2$ end their scanning session and at which the radars $R_1$ and $R_2$ provide a plurality of GMTI plots. In other words, each GMTI radar $R_1$ and $R_2$ provides a plurality of GMTI plots at the end of each scanning session, i.e., end scan time $T_{e1}$ and $T_{e2}$, correspondingly. Accordingly, the GMTI radar $R_1$ performs a scanning session in a time frame of $[T_{s1}; T_{e1}]$, namely from the time $T_{s1}$ to the time $T_{e1}$. During the scanning time frame $[T_{s1}; T_{e1}]$, the radar $R_1$ detects one or more targets in the area of interest within the scanning time frame $[T_{s1}; T_{e1}]$ and provides the GMTI plots associated with these targets at the time $T_{e1}$. The GMTI radar $R_2$ performs a scanning session in a time frame of $[T_{s2}; T_{e2}]$ namely from the time $T_{s2}$ to the time $T_{e2}$. During the interval $[T_{s2}; T_{e2}]$, the radar $R_2$ detects one or more targets in the area of interest within the scanning time frame $[T_{s2}; T_{e2}]$ and provides the GMTI plots at the time $T_{e2}$. Each GMTI plot is associated with a certain target detected within the area of interest at a certain time t within the scanning time frame (i.e. for radar $R_1$ $T_{s1} \leq t \leq T_{e1}$ and for radar $R_2$ $T_{s2} \leq t \leq T_{e2}$) of the corresponding GMTI radar. It should be understood that after completing one scanning session, the GMTI radars $R_1$ and $R_2$ can perform a new scanning session having the same scanning time frames $[T_{s1}; T_{e1}]$ and $[T_{s2}; T_{e2}]$, correspondingly.

In operation of the radars $R_1$ and $R_2$, one of the radars $R_1$ and $R_2$ ends its scanning session after the other. In other words at least one of the radars $R_1$ and $R_2$ is the last to end scanning session. For example, if the radar $R_1$ ends its scanning session before the radar $R_2$, then $T_{e2} > T_{e1}$. Thus, $T_{e2}$ is the last end scan time. Likewise, if the radar $R_2$ ends its scanning session before $R_1$, then $T_{e1} > T_{e2}$. In this case, $T_{e1}$ is the last end scan time.

In this embodiment, the radar $R_2$ is the last to end a scanning session. When the radar $R_1$, which ends its scanning session before radar $R_2$ (i.e., $T_{e1} < T_{e2}$), completes more than one scanning sessions before $T_{e2}$, the last scanning session performed by such GMTI radar $R_1$ within the scanning time frame $[T_{s2}; T_{e2}]$ of the GMTI radar $R_2$, is referred to as the last session of the GMTI radar $R_1$.

As mentioned above, each GMTI plot is associated with a certain target in the area of interest obtained at a certain time t within the scanning time frame of the corresponding GMTI radar. Each GMTI plot can include radial (Doppler) velocity $v_D(t)$ of the target at a certain time t within the scanning time frame of the corresponding GMTI radar and location data, which can be represented by a location vector $(r(t), \theta(t))$, wherein, $r(t)$ is the distance of a target from the corresponding GMTI radar at time t within the scanning time frame of the corresponding GMTI radar, $\theta(t)$ is the azimuth angle of a target at time t within the scanning time frame.

Each conversion unit $C_1$ and $C_2$ is configured to receive the GMTI plots from the corresponding GMTI radars $R_1$ and $R_2$, and to convert polar coordinates associated with these GMTI plots into the corresponding Cartesian coordinates, thereby to provide converted plots. More specifically, each conversion unit is configured to convert polar coordinates of the location vector $(r(t), \theta(t))$ (indicative of the location data) associated with these plots into Cartesian coordinates.

Accordingly, each converted plot for the purpose of the present invention, can be represented by a converted location vector $(x(t), y(t))$ where $x(t)$ and $y(t)$ are the projections of the location of the target on the x and y-axes, correspondingly, at a certain time t within the scanning time frame of the corresponding GMTI radar.

Accordingly, the location of an object is represented by a two dimensional location vector $(x(t), y(t))$, which is also associated with a 2×2 covariance matrix (1) shown above.

As shown in FIG. 4, the GMTI trackers $TR_1$ and $TR_2$ are in data communication with the corresponding conversion units $C_1$ and $C_2$ for receiving the converted plots therefrom. Each GMTI tracker is configured for constructing preliminary GMTI tracks for each target of the plurality of targets within the area of interest from the provided converted plots.

Each preliminary GMTI track is represented by a 4 dimensional state vector $(x_{tr}(t), y_{tr}(t), v_x(t), v_y(t))$, which includes a location state vector $(x_{tr}(t), y_{tr}(t))$ and a velocity state vector $(v_x(t), v_y(t))$, where $x_{tr}(t)$ and $y_{tr}(t)$ are coordinates of the target track on the x and y-axes, correspondingly, at a certain time t within the scanning time frame of the corresponding GMTI radar, and $v_x(t)$ and $v_y(t)$ are velocity vector projections on the x and y-axes, correspondingly, at that time t.

Each state in the preliminary GMTI track is also associated with a corresponding covariance matrix, which is a 4×4 matrix (2), shown above.

When desired, the system 300 may include track presentation utilities (not shown) associated with the GMTI tracker $TR_1$ and $TR_2$, correspondingly, which are configured for displaying the preliminary GMTI tracks of each tracker to a user of the system 300.

According to an embodiment, the memory utility 20 includes a database (not shown) coupled to the conversion units $C_1$ and $C_2$ and to GMTI trackers $TR_1$ and $TR_2$. The memory utility 20 is configured for receiving the converted plots provided by the plurality of conversion units $C_1$ and $C_2$ and the preliminary GMTI tracks provided by the GMTI trackers $TR_1$ and $TR_2$, and for storing the converted plots and the preliminary GMTI tracks in the database.

The fused plots generator 30 is arranged downstream of the memory utility 20, and is coupled (by wires or wirelessly) to the memory utility 20 for data communication between fused plots generator 30 and the memory utility 20. The fused plots generator 30 is configured to receive the converted plots and the preliminary GMTI tracks from the memory utility 20 and to construct fused plots.

According to an embodiment of the invention, the fused plots generator 30 includes a last plot determination unit 31, a prediction unit 32, an assignment unit 34 arranged downstream of the prediction unit 32, and a fusion unit 36 arranged downstream of the assignment unit 34.

According to an embodiment of the invention, the last plot determination unit 31 is configured to receive all the converted plots obtained from each scanning session of the GMTI radars $R_1$ and $R_2$, and to determine, for each GMTI radar, which of the converted plots are obtained from its last session. The last plot determination unit 31 is also configured to provide these converted plots along with the corresponding preliminary GMTI tracks associated with these converted plots to the prediction unit 32.

Each converted plot is obtained at a corresponding time t within the scanning time frame of the last session of the corresponding GMTI radar. For example, if the last radar is $R_2$, then the last session of the radar $R_1$, is the scanning session is completed before the time when the radar $R_2$ ends its scanning session.

For example, when the radars $R_1$ and $R_2$ start a scanning session at the same time ($T_{s1}=T_{s2}$), and the radar $R_2$ has scanning frame $[T_{s1}; T_{e2}]$ of the session of 10 seconds and the radar $R_1$ has scanning frame $[T_{s2}; T_{e2}]$ of 3 seconds, the radars $R_2$ can complete 3 scanning sessions before $T_{e1}$. Accordingly, the last plot determination unit 31 is can provide, to the prediction unit 32, only the converted plots obtained from the last session of radar $R_1$ i.e., the converted plots obtained from the $3^{rd}$ session of radar $R_1$ along with the corresponding preliminary GMTI tracks associated with these converted plots.

According to an embodiment, last plot determination unit 31 is also configured to utilize only "recent" converted plots, i.e., the converted plots, which are obtained during a predetermined time interval $T_a \leq t \leq T_e$, where $T_a$ is the time, which is relatively close to the end scan time $T_e$ of the session. The "earlier" converted plots obtained before time $T_a$ are ignored by the last plot determination unit 31. For example, such a predetermined time interval can be in the range of 10-20 sec. The converted plots which are obtained within the predetermined time interval $T_a \leq t \leq T_e$ are provided to the prediction unit 32.

For example, when the last radar $R_2$ has the scanning frame $[T_{s2}; T_{e2}]$ of 20 seconds, and the radar $R_1$ has the scanning frame $[T_{s1}; T_{e1}]$ of 10 seconds and ends its scanning session 5 seconds before radar $R_2$ (i.e., $T_{e2}-T_{e1}=5$ sec) and the predetermined time interval is 10 seconds, the last plot determination unit 31 should utilize the converted plots of the radar $R_2$ which are obtained during last 10 seconds of the scanning frame, and the converted plots obtained by radar $R_1$ during the last 5 seconds. In turn, the converted plots obtained by the radar $R_2$ in this scanning session during the interval of $[T_{s2}; T_{s2}+10$ sec$]$ and the converted plots obtained by the radar $R_1$ in this scanning session during the interval of $[T_{s1}; T_{s1}+5$ sec$]$ should be ignored.

According to an embodiment of the invention, the prediction unit 32 is configured to receive the converted plots and the preliminary GMTI tracks from the memory utility 20 and to generate "predicted plots". As described above, each converted plot has its corresponding time tag at which the target associated with this plot is detected. The predicted plots are indicative of estimated locations of the plurality of targets at a certain time. This time is selected from the scanning time frame of the last radar, i.e. the radar which is last to end a scanning session. This time is common for all the predicted plots associated with GMTI radars $R_1$ and $R_2$.

According to an embodiment, such a common time is the end scan time of the GMTI radar, selected from radar $R_1$ and radar $R_2$, which is the last to end a scanning session.

For each GMTI radar $R_1$ and $R_2$, the predicted plots are constructed by advancing each converted plot (i.e. updating converted location vectors of each converted plot) to a common which is the end scan time of the last GMTI radar (i.e. which is the last to end a scanning session), thereby assigning a common time tag to all the converted plots.

Specifically, the updating of the converted location vectors of the converted plots includes constructing predicted location vectors which are constructed by advancing the converted location vectors to a common time $t_p$ which is the end scan time of the GMTI radar which is the last to end a scanning session, thus assigning a common time tag to all the converted plots originated from all the GMTI radars.

For the purpose of the present invention, the predicted location vectors are in the form of $S=(x_p(t_p), y_p(t_p))$, where $t_p$ is the common time to which the converted plots are advanced. According to an embodiment, the common time $t_p$ is an end scan time of the radar, which is the last to end a scanning session and, $x_p(t_p)$ and $y_p(t_p)$ are the predicted location projections of the target on the x and y axis, correspondingly, at the common time $t_p$. Each predicted location vector S is associated with a corresponding covariance error matrix M (3).

In order to construct the predicted plots, the prediction unit 32 utilizes a prediction model. The prediction model uses data of the location projections x(t) and y(t) of a target at a certain time t, which is within the scanning time frame of the corresponding GMTI radar and the velocity of the target at the time t. The location projections x(t) and y(t) are obtained from the converted location vectors (x(t), y(t)). According to an embodiment the velocity is obtained from the corresponding state vector $(x_{tr}(t), y_{tr}(t), v_x(t), v_y(t))$.

Since the time intervals between the GMTI plots is usually up to a few seconds, the velocity can be assumed to be constant. Accordingly, the components $x_p(t_p)$ and $y_p(t_p)$ of each predicted location vector S can be calculated by using the equations (1a) and (1b).

In this embodiment the end scan time of the last radar is $T_{e2}$ (i.e. $t_p=T_{e2}$) since the GMTI radar which is last to end a scanning session is $R_2$. In this case, the prediction unit 32 is configured to "advance" the converted plots of GMTI radars $R_1$ and $R_2$ to common time $T_{e2}$ of the radar $R_2$, which in this case is the last to end a scanning session. In other words, the corresponding converted location vectors are updated to common time $T_{e2}$ of the radar $R_2$.

Accordingly, the predicted location vectors are in the form of $S=(x_p(T_{e2}), y_p(T_{e2}))$, where the components $x_p(T_{e2})$ and $y_p(T_{e2})$ of the predicted location vector S can be calculated by using the equations:

$$x_p(T_{e2}) = x(t) + v_x(t) \cdot (T_{e2} - t) \qquad (8a)$$

$$y_p(T_{e2}) = y(t) + v_y(t) \cdot (T_{e2} - t) \qquad (8b)$$

As a result of the above calculations, the prediction unit 32 generates predicted plots having a common time tag which is the end scan time of $T_{e2}$ the last radar $R_2$ (which is the last to end a scanning session).

In this embodiment, the radar $R_2$ is the last to end a scanning session. As mentioned, the radar $R_1$ may complete more than one scanning sessions before $T_{e2}$. Accordingly, the prediction unit 32 receives only the converted plots which are obtained from the last session of each radar $R_1$. Thus, the predicted plots for the radar $R_1$ are constructed based only on these converted plots which are obtained from the last session thereof.

According to an embodiment, the predicted plots, for each radar $R_1$ and $R_2$, are constructed form the converted plots which are obtained during a predetermined time interval $[T_a;$ $T_{e2}$], where $T_a$ is the time which relatively close to the end scan time $T_{e2}$ of the scanning session of the radar $R_2$, which is last to end a scanning session. As mentioned above, such a predetermined time interval can be in the range of 25-30 sec.

It should be noted that, the converted plots originated from the last radar $R_2$ to end a scanning session, which are obtained at any time t between $T_a$ and $T_{en}$ within the scanning time frame [$T_{s2}$; $T_{e2}$], should also be advanced to the time $T_{e2}$. It should also be noted that for each predicted plot constant velocity is assumed, since the time difference between operation of the GMTI radars $R_1$ and $R_2$ are typically small, up to a few seconds.

According to an embodiment, the assignment unit 34 is configured to assign the predicted plots to the corresponding targets detected by GMTI radars $R_1$ and $R_2$ by applying an assignment procedure. In the assignment procedure, each target detected by the GMTI radar $R_1$ is assigned to the corresponding predicted plot detected by the GMTI Radar $R_2$.

For example, the assignment procedure can be the "Munkres" assignment procedure. In this case, the assignment unit 34 constructs a matrix in which the rows are data associate with the predicted plots from the last radar $R_2$ and the columns are data associate with the predicted plots of the radar $R_1$. Specifically, the matrix elements can be the statistical distances between the plots. For determining which of the pairs of the plots are associated the Munkres procedure calculates the total minimum cost which determines the associated pairs of plots.

The fusion unit 36 is configured to construct fused plots. Each fused plot includes location data associated with a certain target.

According to an embodiment, each fused plot is constructed from the predicted plots which are assigned to a certain target. The fused plots can be represented by corresponding fused plot vectors f=($x_f$,$y_f$), where $x_f$ and $y_f$ are the fused location projections of the target on the x and y axis.

Each fused plot is calculated by using a fusion equation:

$$f = F \cdot (M_1^{-1} \cdot S_1 + M_2^{-1} \cdot S_2), \quad (9)$$

wherein $S_1$ and $S_2$ are predicted location vectors of the predicted plots associated with radars $R_1$ and $R_2$, correspondingly, assigned to a certain target, and $M_1^{-1}$ and $M_2^{-1}$ are the inverse covariance matrices associated with the predicted location vectors $S_1$ and $S_2$ correspondingly, and F is the fused covariance matrix which is calculated using the equation:

$$F = \frac{1}{M_1^{-1} + M_2^{-1}}, \quad (10)$$

wherein $M_1^{-1}$ and $M_2^{-1}$ are the inverse covariance matrices associated with radars $R_1$ and $R_2$ correspondingly.

According to an embodiment of the present invention, the fusion system 300 also includes a fused track generator 38 arranged downstream of the fused plots generator 30. The fused track generator 38 is configured to receive the fused tracks from the fused plots generator 30 and to generate fused tracks for the plurality of targets from the fused plots.

The fused track generator 38 includes a fused tracker (not shown) that is configured for generating fused tracks for the plurality of targets. The fused tracks are generated based on the fused plots.

According to an embodiment of the invention, the system 300 may further include a fused tracks presentation utility 40 arranged downstream of the fused track generator 38. The fused tracks presentation utility 40 is configured for receiving the fused tracks from the fused track generator 38 and for displaying the fused tracks to a user.

Figure 5:
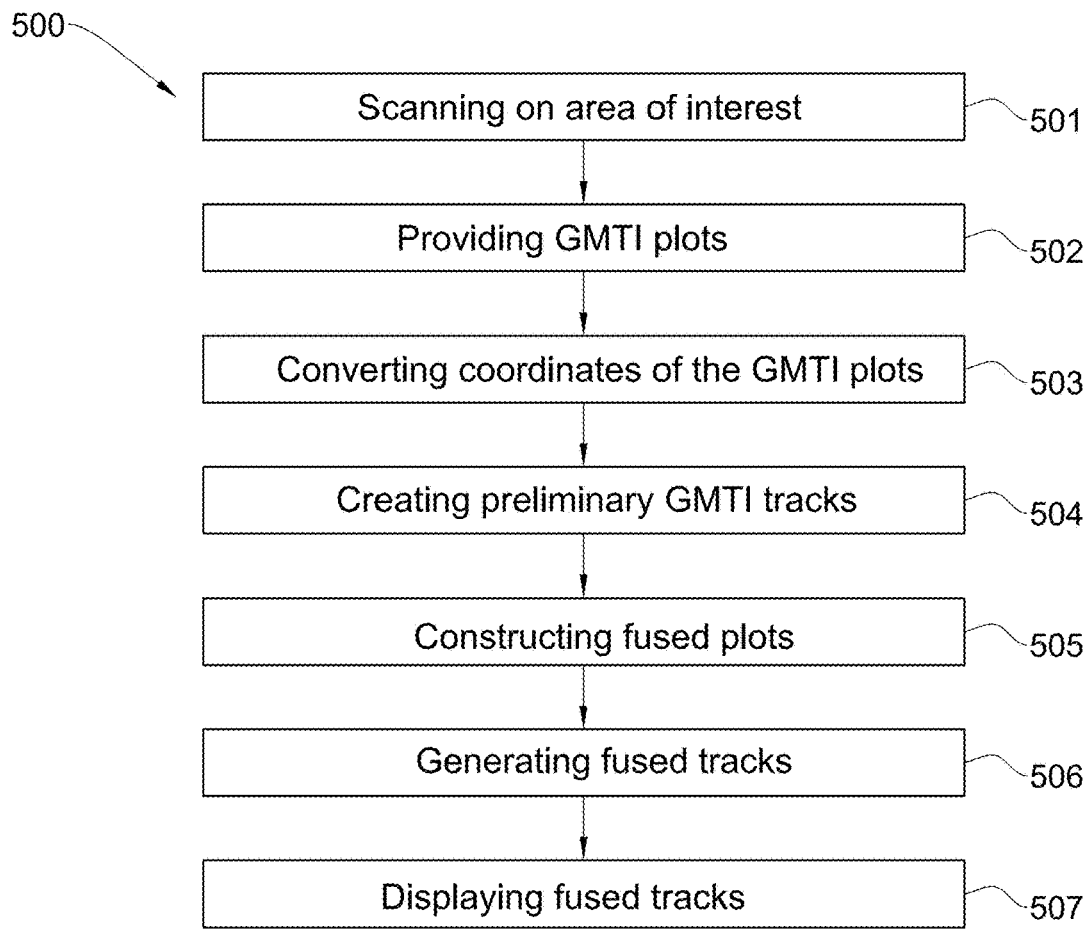
FIG. 5 illustrates a schematic flow-chart diagram of a fusion method for constructing tracks of a plurality of targets, according to an embodiment of the present invention.

Referring to FIG. 5, a flow chart diagram of a method 500 for constructing tracks for a plurality of targets from radar detections by using the system 200 in FIG. 2 is illustrated, according to an embodiment of the present invention.

In operation of the system 200, at least one scanning session is performed in which an area of interest is scanned (block 501) within a corresponding scanning time frame [$T_{si}$; $T_{ei}$], where $T_{si}$ is the start scan time at which the i-th GMTI radar starts its scanning session of scanning the area of interest, and $T_{ei}$ is the end scan time at which the i-th GMTI radar ends its scanning session and at which the i-th GMTI radar provides a plurality of GMTI plots.

During the scanning time frame [$T_{si}$; $T_{ei}$] of each scanning session, each GMTI radar detects one or more targets in the area of interest within the scanning time frame [$T_{si}$; $T_{ei}$] and provides the GMTI (block 502) plots associated with these targets at the time $T_{ei}$. Each GMTI plot is associated with a certain target detected in the area of interest at certain time t within the scanning time frame [$T_{si}$; $T_{ei}$].

The GMTI plots are in the form of location vectors, the location vectors including at least location data of the plurality of targets in polar coordinates.

The method further includes converting (block 503) the coordinates of the GMTI plots from polar coordinates to Cartesian coordinates, thereby providing converted plots. Each converted plot can be represented by a converted location vector (x(t), y(t)), where x(t) is the projection of the location of the target on the x-axis at a certain time t and y(t) is the projection of the location of the target on the y-axis at a certain time t.

Accordingly, the location of a target is represented by a two dimensional converted location vector (x(t), y(t)), which is also associated with a 2×2 covariance matrix for the noise $$\begin{pmatrix} \sigma_x^2 & \sigma_x \sigma_y \\ \sigma_x \sigma_y & \sigma_y^2 \end{pmatrix}, \quad (1)$$

where $\sigma_x$ and $\sigma_y$ are the corresponding variances of x and y. The covariance matrix is indicative of the noise ellipse of each GMTI radar.

Further, preliminary GMTI tracks of the plurality of targets from the GMTI plots are created (block 504). Each state in the preliminary GMTI track is represented by a 4 dimensional state vector ($x_{tr}(t)$, $y_{tr}(t)$, $v_x(t)$, $v_y(t)$), which includes a position vector ($x_{tr}(t)$, $y_{tr}(t)$) and a velocity vector ($v_x(t)$, $v_y(t)$), where $x_{tr}(t)$ and $y_{tr}(t)$ are coordinates of the target track on the x and y-axes, correspondingly, at a certain time t within the scanning time frame of the corresponding GMTI radar, and $v_x(t)$ and $v_y$ are velocity vector projections on the x and y-axes, correspondingly, at that time t.

Each state in the preliminary GMTI track is also associated with a corresponding covariance matrix, which is a 4×4 matrix $$\begin{pmatrix} \sigma_x^2 & \sigma_x\sigma_y & \sigma_x\sigma_{v_x} & \sigma_x\sigma_{v_y} \\ \sigma_x\sigma_y & \sigma_y^2 & \sigma_y\sigma_{v_x} & \sigma_y\sigma_{v_y} \\ \sigma_x\sigma_{v_x} & \sigma_y\sigma_{v_x} & \sigma_{v_x}^2 & \sigma_{v_x}\sigma_{v_y} \\ \sigma_x\sigma_{v_y} & \sigma_y\sigma_{v_y} & \sigma_{v_x}\sigma_{v_y} & \sigma_{v_y}^2 \end{pmatrix}, \quad (2)$$

where $\sigma_x$, $\sigma_y$, $\sigma_{v_x}$, and $\sigma_{v_y}$ are the variances of the corresponding variables $x_{tr}(t)$, $y_{tr}(t)$, $v_x(t)$, $v_y(t)$.

The method also includes constructing fused plots (block 505) from the converted plots and the preliminary GMTI tracks.

According to an embodiment, construction of the fused plots includes generating predicted plots for each GMTI radar, which are based on the converted plots obtained during the last scanning sessions of the GMTI radars and on the preliminary GMTI tracks associated with these converted plots. As described above, the predicted plots are generated by assigning a common time tag to all the converted plots from all the GMTI radars.

The predicted plots are in the form of predicted location vectors $S=(x_p(t_p), y_p(t_p))$, where $t_p$ is the common time to which the converted plots are advanced. According to an embodiment, the common time $t_p$ is an end scan time of the radar, which is the last to end a scanning session and, $x_p(t_p)$ and $y_p(t_p)$ are the predicted location projections of the target on the x and y axis, correspondingly, at the common time $t_p$.

According to an embodiment, the predicted location projections $x_p(t_p)$ and $y_p(t_p)$ of the target are calculated by using the equations:

$$x_p(t_p) = x(t) + v_x(t) \cdot (t_p - t)$$

$$y_p(t_p) = y(t) + v_y(t) \cdot (t_p - t).$$

The predicted location vectors $S=(x_p(t_p), y_p(t_p))$ are associated with a corresponding covariance error matrix $$M_i = \begin{pmatrix} \sigma_{x_p}^2 & \sigma_{x_p}\sigma_{y_p} \\ \sigma_{x_p}\sigma_{y_p} & \sigma_{y_p}^2 \end{pmatrix}$$

where i=1, 2, . . . n, where n is the number of the GMTI radars in the plurality of radars.

The construction of the fused plots also includes assigning of the predicted plots to the corresponding targets.

Further, each fused plot is constructed from the predicted plots which are assigned to a certain target. Each fused plot includes location data associated with a certain target. The fused plots can be represented by corresponding fused location vectors $f=(x_f, y_f)$, where $x_f$ and $y_f$ are the fused location projections of the target on the x and y axis.

According to an embodiment, each fused plot is calculated by:

$$f = F \cdot (M_1^{-1} \cdot S_1 + M_2^{-1} \cdot S_2 + \cdots + M_n^{-1} \cdot S_n),$$

where $S_1, S_2, \ldots, S_n$ are predicted location vectors of the predicted plots associated with the n GMTI radars, correspondingly, assigned to a certain target, and $M_1^{-1}$, $M_2^{-1}, \ldots, M_n^{-1}$ are the inverse covariance error matrices associated with the predicted location vectors $S_1, S_2, \ldots, S_n$, correspondingly, and F is the fused covariance matrix, which is calculated by using the equation:

$$F = \frac{1}{M_1^{-1} + M_2^{-1} + \cdots + M_n^{-1}}.$$

Finally, the method for constructing fused tracks for a plurality of targets from radar detections includes generating fused tracks (block 506) for the plurality of targets from the fused plots.

According to an embodiment of the present invention, the fusion method also includes displaying (block 507) the fused tracks to a user.

Figure 6:
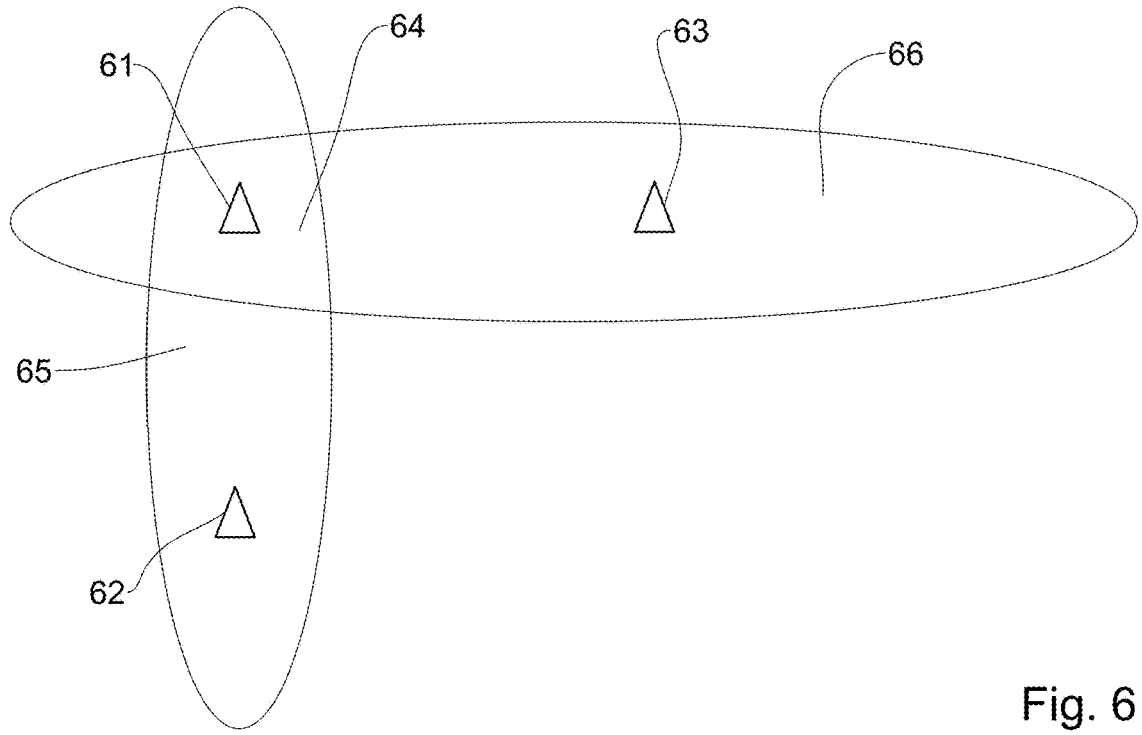
FIG. 6 illustrates schematically creation of a fused plot from predicted plots by the fusion system, according to an embodiment of the present invention.

Referring to FIG. 6, a schematic illustration of creation of a fused plot 61 from predicted plots 62 and 63 by the fusion system shown in FIG. 4 is shown, according to an embodiment of the present invention. The fused plot 61 is obtained on the basis of detections of a single target (not shown) by GMTI radars $R_1$ and $R_2$.

As can be seen from FIG. 6, the fused plot 61 is located in the intersection area 64 obtained by intersection of the corresponding clutter ellipses 65 and 66 which are associated with the predicted plots 62 and 63, correspondingly.

The fused plot 61 is calculated using the fusion equations (8a), (8b) and (9), where the clutter ellipses 65 and 66 are associated with corresponding covariance matrices (1).

Figure 7:
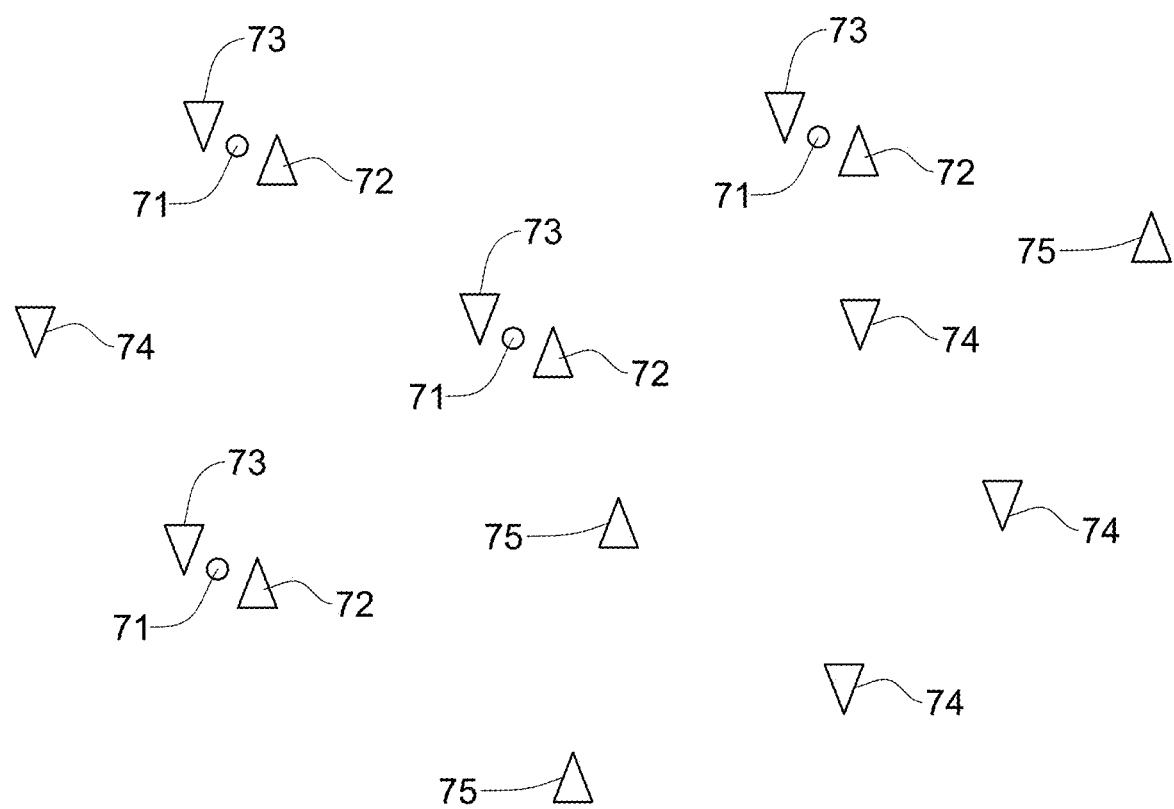
FIG. 7 illustrates schematically creation of a fused plot from predicted plots by the fusion system, according to another embodiment of the present invention.

Referring to FIG. 7, a schematic illustration of creation of fused plots 71 from predicted plots 72 and 73 by the fusion system shown in FIG. 4, according to another embodiment of the present invention. The fused plots 71 are obtained on the basis of detections of a plurality of targets (not shown) by GMTI radars $R_1$ and $R_2$.

The predicted plots 72 obtained on the basis of detections by the GMTI radar $R_1$ are represented by the Greek symbol delta ($\Delta$), while predicted plots 73 obtained on the basis of detections by the GMTI radar $R_2$ are represented by the symbol nabla ($\nabla$), i.e., by the inverted Greek symbol delta. In turn, the fused plots 71 obtained from the predicted plots 72 and 73 are represented by circles (○).

For each target, the corresponding predicted plot obtained from detections by the radar $R_1$ is assigned to its corresponding predicted plot obtained from detections by the radar $R_2$ by using an assignment procedure, as described above. As can be seen in FIG. 7, predicted plots 74 obtained on the basis of detections by the GMTI radar $R_1$ are unassigned to the corresponding predicted plots 75 obtained from detections by the radar $R_2$. According to an embodiment of the present invention, such unassigned predicted plots 74 and 75 are defined as fused plots.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

In the present application, as well as in the relevant art, an arrangement of one unit downstream of another unit implies electrical coupling of these units to each other with a possibility to transfer electrical signals between the elements in the direction of the current associated with the transferring of the electrical signals. In operation, the meaning of the arrangement in which a unit A is arranged downstream of a unit B means that the unit B receives output from the unit A. For completeness, it should be noted that use of the phrase "arranged downstream" in fact enhances the clarity of the claims in that it is very helpful for description of systems in which the unit B operates after the operation of the unit A.

Finally, it should be noted that the words "comprising", "including" and "having" as used throughout the appended claims are to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A fusion system for constructing fused tracks for a plurality of targets from radar detections, comprising:
   a plurality of Ground Moving Target Indicator (GMTI) radars configured for detecting said plurality of targets in an area of interest, each GMTI radar configured and operable for
   (i) scanning the area of interest within a corresponding scanning time frame, the scanning time frame of operation of each GMTI radar having a start scan time of scanning said area of interest and an end scan time of scanning said area of interest, and
   (ii) providing GMTI plots in the form of plot vectors including at least location data of said plurality of targets in polar coordinates;
   a plurality of conversion units arranged downstream of said plurality of GMTI radars, each conversion unit being in data communication with a corresponding GMTI radar, and configured to receive the GMTI plots from the corresponding GMTI radar and to convert coordinates of each GMTI plot from polar coordinates to Cartesian coordinates, thereby providing converted plots;
   a plurality of GMTI trackers arranged downstream of said plurality of GMTI radars, each GMTI tracker being in data communication with a corresponding GMTI radar, and configured to create preliminary GMTI tracks of said plurality of targets from the GMTI plots provided by said corresponding GMTI radar;
   a fused plots generator arranged downstream of the plurality of GMTI trackers in data communication therewith, said fused plots generator configured for constructing fused plots by using said converted plots and said preliminary GMTI tracks; and
   a fused track generator configured to generate fused tracks for said plurality of targets from said fused plots.

2. The fusion system of claim 1, wherein said plurality GMTI radars are arranged in a predetermined geometric arrangement in which lines of sight of said plurality of GMTI radars are directed at angles of 180/n between each other.

3. The fusion system of claim 1, wherein each GMTI radar of said plurality of GMTI radars provides all the GMTI plots associated with said one or more targets at said end scan time.

4. The fusion system of claim 1, wherein said plot vectors are in the form of $(r(t), \theta(t), v_D(t))$, where $r(t)$ is the distance of a target from a corresponding GMTI radar at time t within said scanning time frame of said corresponding GMTI radar, $\theta(t)$ is the azimuth angle of the target at time t within said scanning time frame and $v_D(t)$ is the radial velocity of the target at the time t within said scanning time frame of said corresponding GMTI radar; and wherein said converted plots are represented by converted plot vectors $(x(t), y(t), v_D(t))$, where $x(t)$ is the projection of the location of the target on the x-axis at a time t and $y(t)$ is the projection of the location of the target on the y-axis at the time t.

5. The fusion system of claim 4, wherein said converted plots are associated with a 2×2 covariance matrix for noise $$\begin{pmatrix} \sigma_x^2 & \sigma_x\sigma_y \\ \sigma_x\sigma_y & \sigma_y^2 \end{pmatrix}.$$

6. The fusion system of claim 1, wherein said preliminary GMTI tracks are represented by a 4 dimensional state vector $(x_{tr}(t), y_{tr}(t), v_x(t), v_y(t))$, where $x_{tr}(t)$ and $y_{tr}(t)$ are coordinates of the target track on x and y axes correspondingly, and where $v_x(t)$ and $v_y(t)$ are the velocity vector projections on the x and y axes, correspondingly, and wherein said preliminary GMTI tracks are associated with a corresponding covariance matrix, which is a 4×4 matrix:

$$\begin{pmatrix} \sigma_x^2 & \sigma_x\sigma_y & \sigma_x\sigma_{v_x} & \sigma_x\sigma_{v_y} \\ \sigma_x\sigma_y & \sigma_y^2 & \sigma_y\sigma_{v_x} & \sigma_y\sigma_{v_y} \\ \sigma_x\sigma_{v_x} & \sigma_y\sigma_{v_x} & \sigma_{v_x}^2 & \sigma_{v_x}\sigma_{v_y} \\ \sigma_x\sigma_{v_y} & \sigma_y\sigma_{v_y} & \sigma_{v_x}\sigma_{v_y} & \sigma_{v_y}^2 \end{pmatrix}.$$

7. The fusion system of claim 1, wherein said plurality of GMTI radars operate in at least one of the following manner:
   (i) sequentially one after another;
   (ii) concurrently such that their scanning time frames at least partially overlap; and wherein at least one of said plurality of GMTI radars is a last to stop operating.

8. The fusion system of claim 1, wherein the fused plots generator includes:
   a prediction unit configured to generate predicted plots based on the converted plots and the preliminary GMTI tracks by assigning a common time tag to all the converted plots from said plurality of the GMTI radars, wherein said predicted plots are in the form of predicted plot vectors indicative of locations of said plurality of targets, said predicted plot vectors are in the form of $S=(x_p(t_p), y_p(t_p))$, where $t_p$ is the end scan time of the radar which is the last to stop operating, and where $x_p(t_p)$ and $y_p(t_p)$ are predicted location projections of the target on the x and y axes, correspondingly, at time $t_p$; and wherein said predicted plot vectors are associated with a corresponding covariance error matrix $$M_i = \begin{pmatrix} \sigma_{x_p}^2 & \sigma_{x_p}\sigma_{y_p} \\ \sigma_{x_p}\sigma_{y_p} & \sigma_{y_p}^2 \end{pmatrix},$$

where i=1, 2, ... n, and n is the number of the GMTI radars in said plurality of radars; and an assignment unit configured to assign the predicted plots from the plurality of GMTI radars to corresponding targets from said plurality of targets;

a fusion unit configured to construct fused plots for said plurality of the targets from corresponding predicted plots; said fused plots are represented by corresponding fused plot vectors f=($x_f$, $y_f$), where $x_f$ and $y_f$ are the fused location projections of the target on the x and y axes, correspondingly.

9. The fusion system of claim 8, wherein said predicted location projections of the target $x_p(t_p)$ and $y_p(t_p)$ are calculated by using the equations:

$$x_p(t_p) = x(t) + v_x(t) \cdot (t_p - t)$$
$$y_p(t_p) = y(t) + v_y(t) \cdot (t_p - t).$$

10. The fusion system of claim 8, wherein each fused plot is calculated by:

$$f = F \cdot (M_1^{-1} \cdot S_1 + M_2^{-1} \cdot S_2 + \cdots + M_n^{-1} \cdot S_n),$$

where $S_1, S_2, \ldots, S_n$ are predicted plot vectors associated with the plurality of GMTI ($R_1, R_2, \ldots,$ and $R_n$) radars, and $M_1^{-1}, M_2^{-1}, \ldots, M_n^{-1}$ are the inverse covariance error matrices associated with the predicted plot vectors $S_1, S_2, \ldots, S_n$, correspondingly, and F is the fused covariance matrix, which is calculated by using the equation:

$$F = \frac{1}{M_1^{-1} + M_2^{-1} + \cdots + M_n^{-1}}.$$

11. The fusion system of claim 1, further comprising a memory utility coupled to said plurality of conversion units and said plurality of GMTI radars, the memory utility including a database configured for receiving the converted plots and the preliminary GMTI tracks and storing the GMTI plots and the preliminary GMTI tracks in the database.

12. The fusion system of claim 1, further comprising a fused tracks presentation utility arranged downstream of the fused track generator, the fused tracks presentation utility being in data communication with the fused track generator, the fused tracks presentation utility configured for receiving the fused tracks from the fused track generator and for displaying the fused tracks to a user.

13. A method for constructing fused tracks for a plurality of targets from radar detections, comprising:

scanning an area of interest within a corresponding scanning time frame by a plurality of Ground Moving Target Indicator (GMTI) radars configured for detecting said plurality of targets in said area of interest;

providing GMTI plots by the plurality of GMTI radars in the form of plot vectors, said plot vectors including at least location data of said plurality of targets in polar coordinates;

converting coordinates of the GMTI plots from polar coordinates to Cartesian coordinates, thereby providing converted plots;

creating preliminary GMTI tracks of said plurality of targets from the GMTI plots;

constructing fused plots by using the converted plots and the preliminary GMTI tracks; and generating fused tracks for said plurality of targets from said fused plots.

14. The method of claim 13, wherein said plot vectors are in the form of (r(t), θ(t), $v_D$(t)), where r(t) is the distance of a target from a corresponding GMTI radar at time t within said scanning time frame of said corresponding GMTI radar, θ(t) is the azimuth angle of the target at time t within said scanning time frame and $v_D$(t) is the radial velocity of the target at the time t within said scanning time frame of said corresponding GMTI radar.

15. The method of claim 13, wherein said converted plots are presented by a converted plot vector (x(t), y(t), (t)), where x(t) is the projection of the location of the target on the x-axis at a time t and y(t) is the projection of the location of the target on the y-axis at the time t, and wherein said converted plots are associated with a 2×2 covariance matrix for noise $$\begin{pmatrix} \sigma_x^2 & \sigma_x\sigma_y \\ \sigma_x\sigma_y & \sigma_y^2 \end{pmatrix}.$$

16. The method of claim 13, wherein operating of said plurality of GMTI radars is carried out in at least one of the following manner:

(i) sequentially one after another;

(ii) concurrently such that their scanning time frames at least partially overlap; and wherein at least one of said plurality of GMTI radars is a last to stop operating.

17. The method of claim 13, wherein the constructing of the fused plots comprises:

generating the predicted plots based on the converted plots and the preliminary GMTI tracks by assigning a common time tag to all the converted plots from said plurality of the GMTI radars, where said predicted plots are in the form of predicted plot vectors indicative of locations of said plurality of targets; and assigning the predicted plots associated with GMTI radars to corresponding targets from said plurality of targets; and constructing the fused plots for said plurality of the targets from the corresponding predicted plots, wherein said fused plots are represented by corresponding fused plot vectors f=($x_f$,$y_f$), where $x_f$ and $y_f$ are the fused location projections of the target on the x and y axes, correspondingly.

18. The method of claim 17, wherein said predicted plot vectors are in the form of S=($x_p(t_p)$, $y_p(t_p)$), where $t_p$ is the end scan time of the radar which is the last to stop operating, and where $x_p(t_p)$ and $y_p(t_p)$ are predicted location projections of the target on the x and y axis correspondingly at time $t_p$, wherein said predicted plot vectors are associated with a corresponding covariance error matrix $$M_i = \begin{pmatrix} \sigma_{x_p}^2 & \sigma_{x_p}\sigma_{y_p} \\ \sigma_{x_p}\sigma_{y_p} & \sigma_{y_p}^2 \end{pmatrix},$$

where i=1, 2, ... n; and n is the number of the GMTI radars in said plurality of radars.

19. The method of claim 18, wherein said predicted location projections of the target $x_p(t_p)$ and $y_p(t_p)$ are calculated by using the equations:

$$x_p(t_p) = x(t) + v_x(t) \cdot (t_p - t)$$
$$y_p(t_p) = y(t) + v_y(t) \cdot (t_p - t).$$

20. The method of claim 19, wherein each fused plot is calculated by:

$$f = F \cdot (M_1^{-1} \cdot S_1 + M_2^{-1} \cdot S_2 + \cdots + M_n^{-1} \cdot S_n),$$

where $S_1, S_2, \ldots, S_n$ are predicted plot vectors associated with the plurality of GMTI radars and $M_1^{-1}$, $M_2^{-1}, \ldots, M_n^{-1}$ are the inverse covariance error matrices associated with the predicted plot vectors $S_1$, $S_2, \ldots, S_n$, correspondingly and F is the fused covariance matrix, which is calculated by using the equation:

$$F = \frac{1}{M_1^{-1} + M_2^{-1} + \cdots + M_n^{-1}}.$$

\* \* \* \* \*